US009068554B2

(12) United States Patent
Healy

(10) Patent No.: US 9,068,554 B2
(45) Date of Patent: Jun. 30, 2015

(54) WAVE ENERGY ELECTRICAL POWER GENERATION

(71) Applicant: James W. Healy, Hollis, NH (US)

(72) Inventor: James W. Healy, Hollis, NH (US)

( * ) Notice: Subject to any disclaimer, the term of this patent is extended or adjusted under 35 U.S.C. 154(b) by 301 days.

(21) Appl. No.: 13/727,235

(22) Filed: Dec. 26, 2012

(65) Prior Publication Data

US 2013/0154267 A1 Jun. 20, 2013

Related U.S. Application Data

(63) Continuation-in-part of application No. 13/375,921, filed as application No. PCT/US2010/037682 on Jun. 8, 2010, now Pat. No. 8,963,352.

(60) Provisional application No. 61/243,328, filed on Sep. 17, 2009, provisional application No. 61/185,413, filed on Jun. 9, 2009.

(51) Int. Cl.
*F03B 13/10* (2006.01)
*F03B 13/12* (2006.01)
*F03B 13/24* (2006.01)

(52) U.S. Cl.
CPC . *F03B 13/24* (2013.01); *Y02E 10/38* (2013.01)

(58) Field of Classification Search
USPC ....... 92/96, 98, 98 D; 290/1 R, 42, 43, 53, 54
See application file for complete search history.

(56) References Cited

U.S. PATENT DOCUMENTS 644,093 A   2/1900  Place
2,715,366 A   8/1955  Vartiainen
(Continued)

FOREIGN PATENT DOCUMENTS

CN  1997821    7/2007
CN  101158330  4/2008
(Continued)

OTHER PUBLICATIONS

First Office Action; CN Appln. No. 201080035248.1; Oct. 10, 2014; 14 pp.

(Continued)

*Primary Examiner* — Tulsidas C Patel
*Assistant Examiner* — Thomas Quigley
(74) *Attorney, Agent, or Firm* — Fish & Richardson P.C.

(57) ABSTRACT

A wave energy electric power generation system has a buoyant body responsive to wave movement and an associated, relatively vertically stationary body, a compressor, a pressure regulator, and an air turbine/generator set. The compressor has a piston that moves reciprocally relative to a cylinder to alternately compress air in opposed chambers. A pressure regulator tank defines a chamber in communication with the compressor for alternately receiving compressed air from opposed compression chambers, a floating piston within the tank applying pressure to compressed air in the chamber, a pressure regulator controlling pressure applied by the piston to the compressed air, and an hydraulic dampening system coupled to the floating piston to restrict unwanted vertical oscillations of the piston, for output of a continuous flow of compressed air at relatively constant pressure. The turbine and generator set receives the flow compressed air from the pressure regulator and/or the compressor to rotate the turbine, driving the generator for generation of electric power. Rolling diaphragm and liquid trough sealing between opposed regions of contrasting pressure/vacuum are also described.

49 Claims, 28 Drawing Sheets

(56) References Cited

U.S. PATENT DOCUMENTS

| | | | |
|---|---|---|---|
| 3,005,444 | A | 10/1961 | Steibel |
| 3,082,596 | A | 3/1963 | McGay et al. |
| 3,327,633 | A | 6/1967 | Duinker et al. |
| 3,950,946 | A | 4/1976 | Sakai et al. |
| 4,208,878 | A | 6/1980 | Rainey |
| 4,383,413 | A | 5/1983 | Wells |
| 4,560,884 | A * | 12/1985 | Whittecar .................. 290/42 |
| 4,594,853 | A * | 6/1986 | Raichlen et al. ............. 60/502 |
| 5,027,000 | A | 6/1991 | Chino et al. |
| 5,411,377 | A | 5/1995 | Houser et al. |
| 6,140,712 | A | 10/2000 | Fredriksson et al. |
| 6,328,539 | B1 * | 12/2001 | Hung ....................... 417/330 |
| 7,199,481 | B2 | 4/2007 | Hirsch |
| 7,377,492 | B2 | 5/2008 | Vranna et al. |
| 7,781,903 | B2 | 8/2010 | Buffard et al. |
| 2003/0000381 | A1 | 1/2003 | Helasuo et al. |
| 2007/0130929 | A1* | 6/2007 | Khan et al. .................. 60/398 |
| 2008/0093852 | A1 | 4/2008 | Vowles et al. |
| 2008/0148723 | A1 | 6/2008 | Birkestrand |
| 2012/0126540 | A1 | 5/2012 | Healy |

FOREIGN PATENT DOCUMENTS

| | | |
|---|---|---|
| CN | 101196157 | 6/2008 |
| CN | 101205869 | 6/2008 |
| CN | 101285450 | 10/2008 |
| JP | 1106 | 2/1928 |

OTHER PUBLICATIONS

Notification of Reasons for Rejection (with English translation); JP Application No. 2012-515030; Mar. 4, 2014; 6pp.

International Search Report and Written Opinion; PCT/US2010/037682; Nov. 5, 2010; 25 pp.

International Search Report; PCT/US13/75596; Apr. 29, 2014; 4 pp.

Notification of Transmittal of International Search Report and Written Opinion; PCT/US13/75596; Apr. 29, 2014; 1p.

Written Opinion; PCT/US13/75596; Apr. 29, 2014; 9 pp.

* cited by examiner

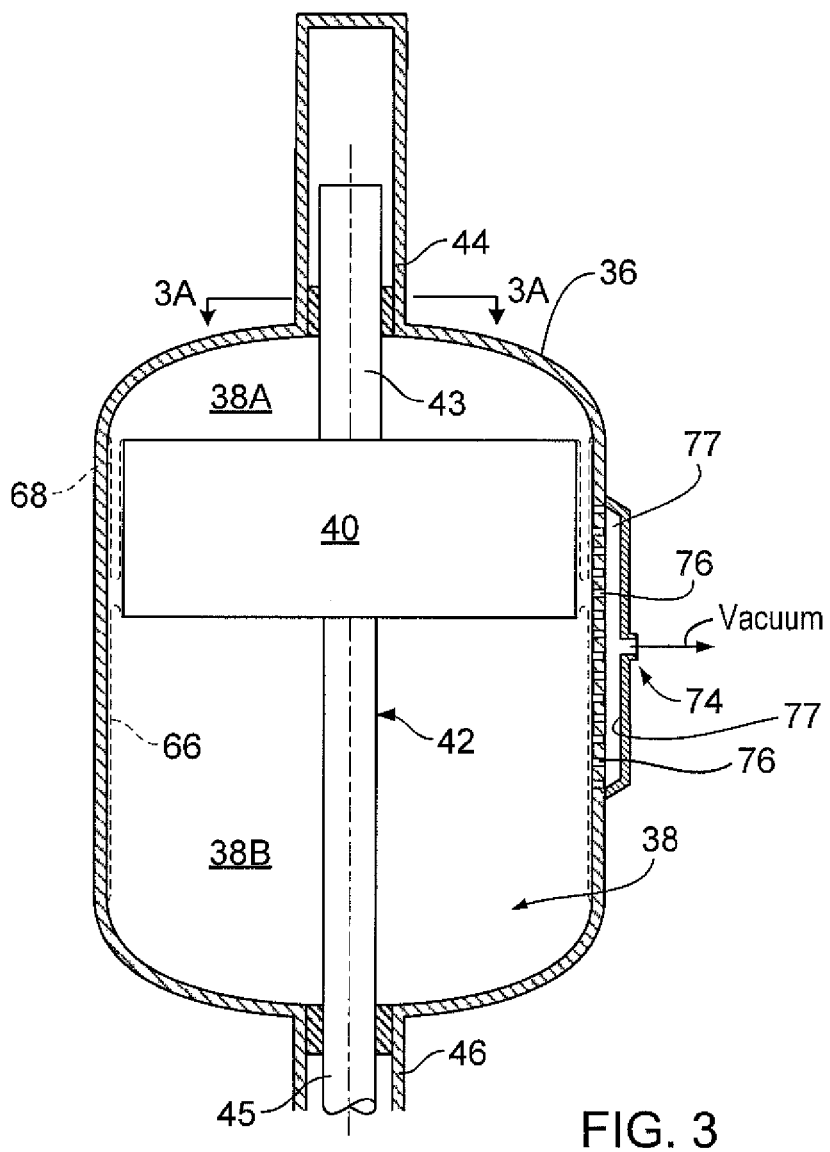
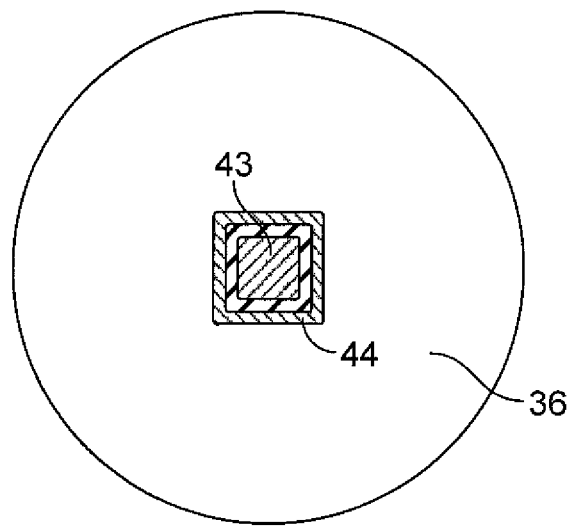
FIG. 3
FIG. 3A

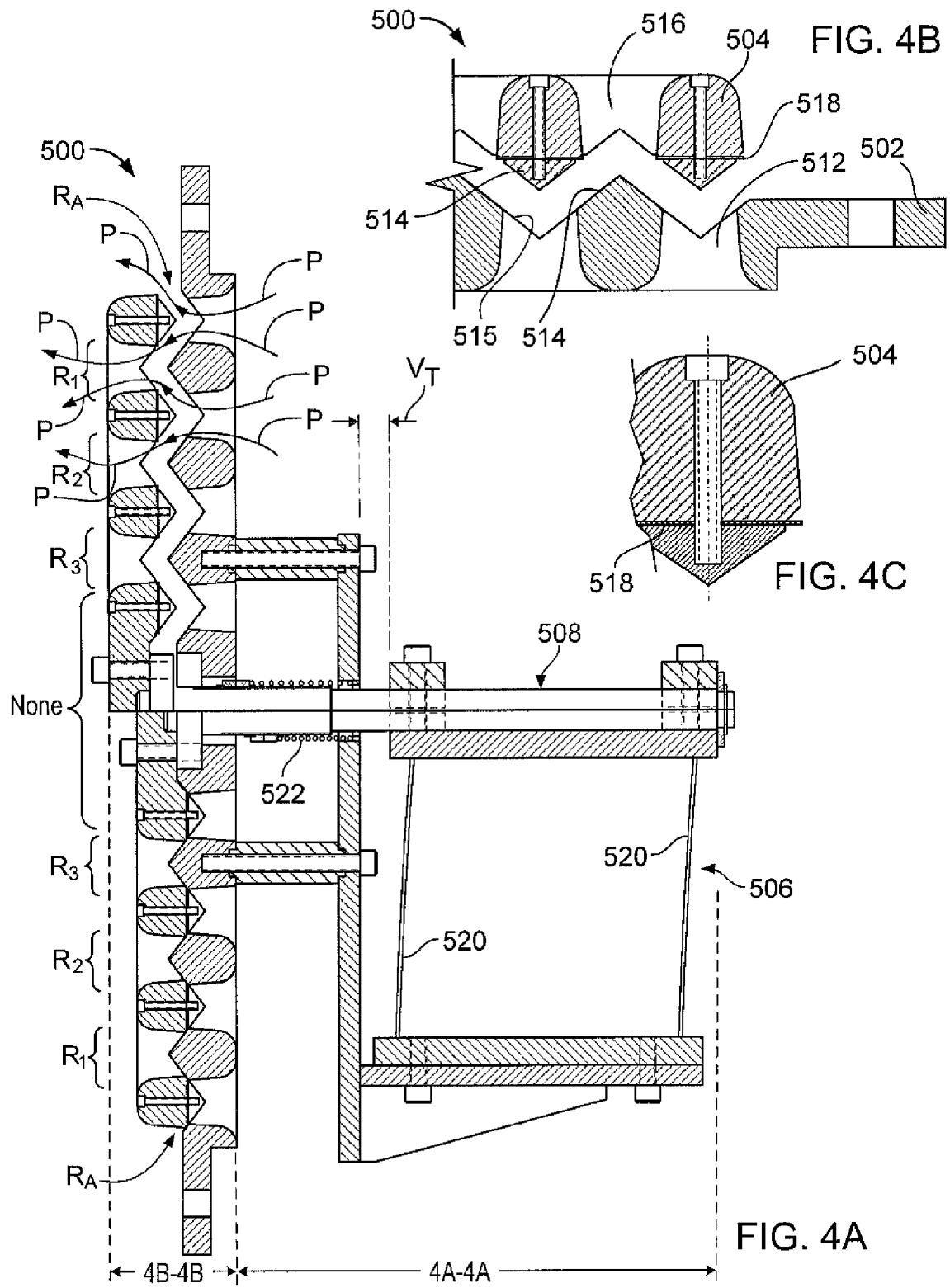

Find Radius Dimensions for Top & Bottom of Rolling Diaphragm $\tan \phi = \frac{2}{48} = 0.04$ $\frac{2}{48.04} = \frac{44.25}{X}$ $X = \frac{44.25 \times 48.04}{2}$ $X = 2126$ in. $= 177$ ft. (53.9 m)

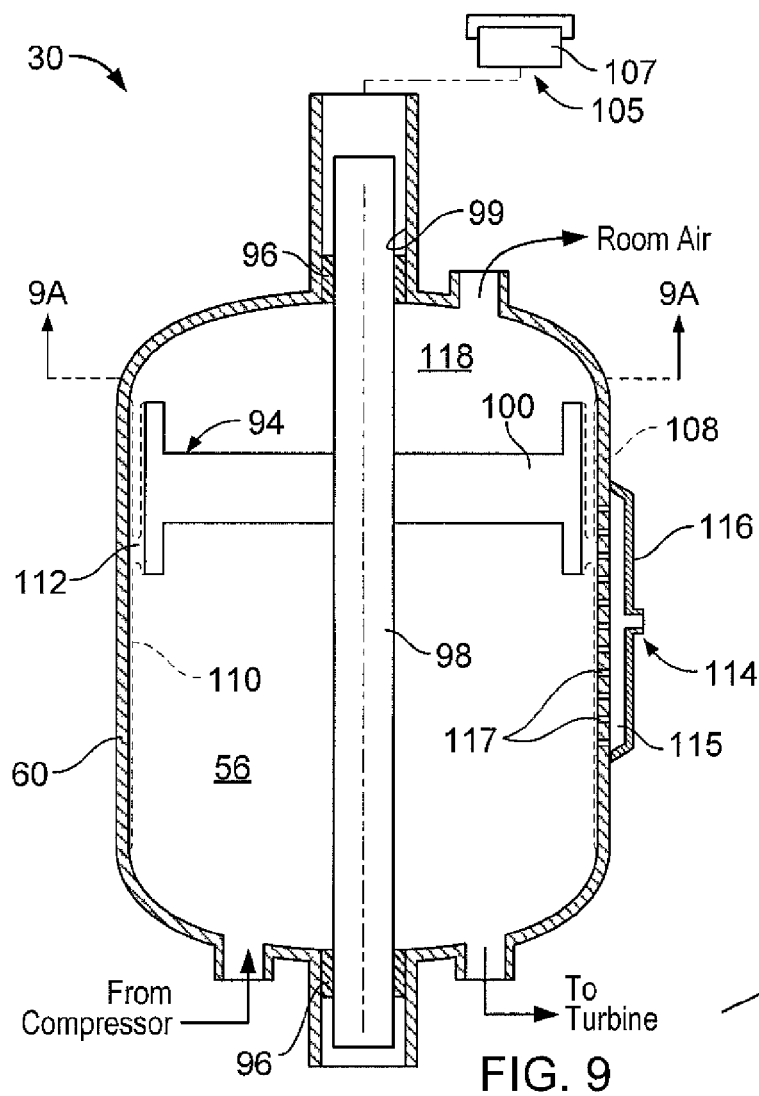
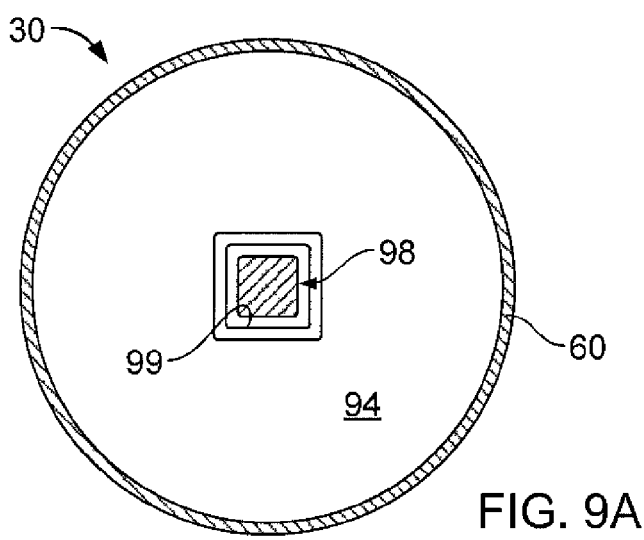
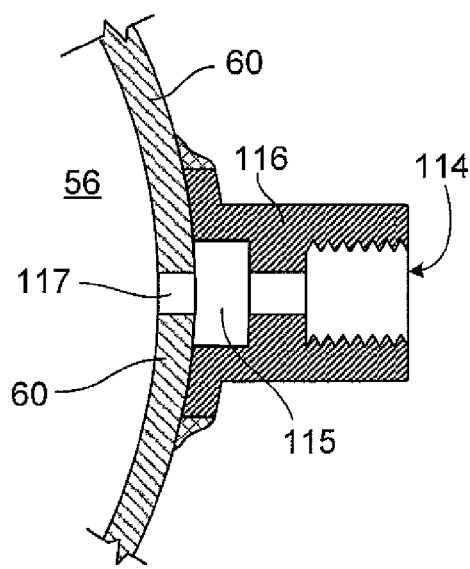
FIG. 9
FIG. 9A
FIG. 9B

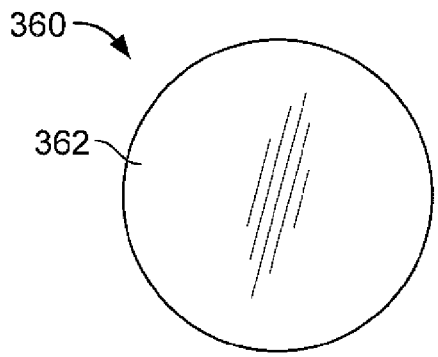
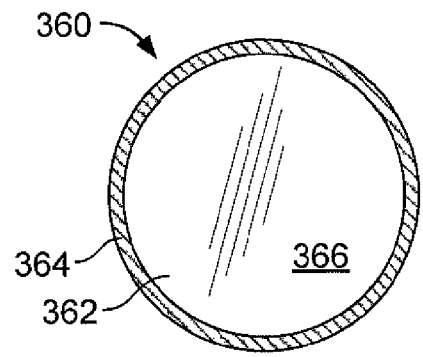
FIG. 14B          FIG. 14C
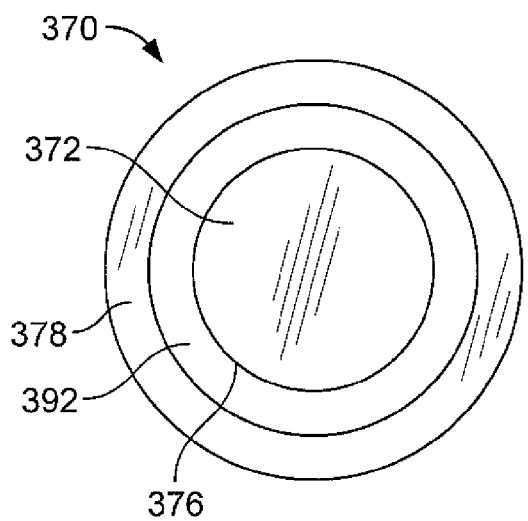
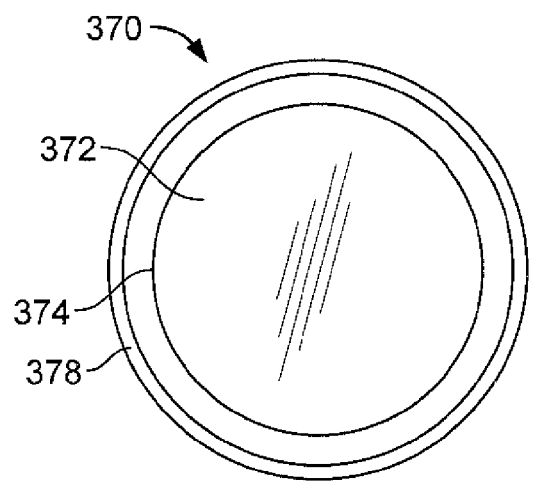
FIG. 14D          FIG. 14E
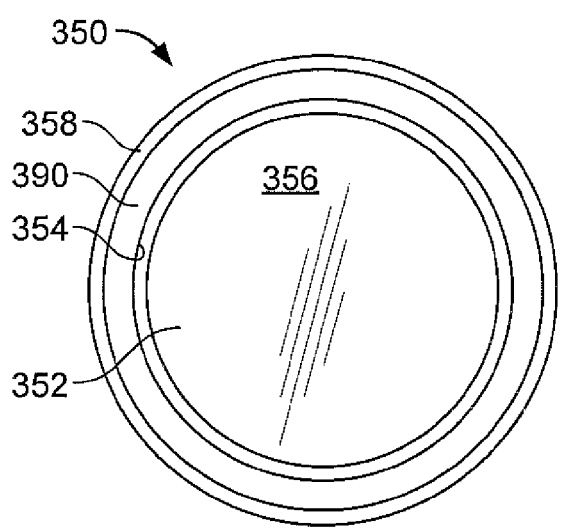
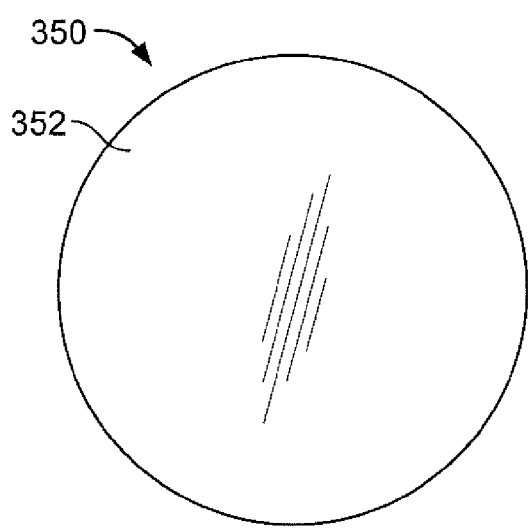
FIG. 14F          FIG. 14G

- Find Weight of Compressor piston including, 1m Long side Cylinder for Liquid Seal or Rolling Diaphragm (assume wall thickness = 0.200 inch (5.1 mm)).

Piston Head Area $\quad A_p = \dfrac{\pi D^2}{4}\quad$ Where D = 2M (78.8 inches)

$$A_p = \dfrac{\pi (78.8)^2}{4} = 4876 \text{ in.}^2 \ (3.15 m^2)$$

Wt. of Piston Head $\quad W_p = VP = [A_p \times 0.200 \text{ inch}] \times 0.3 \text{ lb./in}^3$
$W_p = 293$ lbs. (133 kg)

Skirt Area $\quad A_S = \pi D \times L_S$
$A_S = \pi (78.8) \times 39.4 = 9753 \text{ in}^2 \ (6.29 \ m^2)$ Wt. of Cylinder Skirt $\quad W_S = VP = [9753 \times 0.200] \times 0.3 \text{ lb./in}^3$
$W_S = 585$ lbs. (265 kg)

Total Weight $\quad W_T = 293 + 585 = 878$ lbs. (398 kg)

FIG. 17A

- Find Force Required to Lift Piston Weight ($W_T$) Plus Compress Air to +20 inches W.C. and Draw in Air on Suction side at -3 inches W.C.

$F_L = W_T + [A_P \times (20 \text{ inches W.C.} + 3 \text{ inches W.C.})] / 28 \text{ inches W.C.} / \text{in}^2/\text{lb.}$
$F_L = 878 + [4876 \times 23] / 28$
$F_L = 4005 + 878$
$F_L = 4,883$ lbs. (2,215 kg)

FIG. 17B

- Find Weight of lift piston at 2.83 M.O.D (111.5 inches)
Assume wall Thickness = 0.200 inch (which will include allowance for a 6 inch O.D. by 4 inch I.D. Center shaft approx. 18 feet long).

Piston Head Area  $A_{p_2} = \dfrac{\pi D^2}{4}$  Where D = 111.5 inches $$A_{p_2} = \dfrac{\pi (111.5)^2}{4} = 9764 \text{ in}^2 \text{ (6.30 m}^2\text{)}$$

Wt. of Piston Head  $W_{p_2} = VP = [9764 \times 0.200] \times 0.3 \text{ lb./in}^3$
$W_{p_2} = 586$ lbs. (266 kg)

Skirt Area  $A_{s_2} = \pi D \times L_S$
$A_{s_2} = \pi (111.5) \times 39.4 = 13{,}801 \text{ in}^2 \text{ (8.90 m}^2\text{)}$ Wt. of Cylinder Skirt  $W_{s_2} = VP = [13{,}801 \times 0.200] \times 0.3 \text{ lb./in}^3$
$W_{s_2} = 828$ lbs. (376 kg)

$W_{CS} = (\pi (6^2 - 4^2) \div 4) \times 18\text{ft} \times 12 \text{ in/ft} \times 0.3\text{lb./in}^3$
$W_{CS} = 1{,}018$ lbs. (462 kg)

Total Weight  $W_{T_2} = W_{P_2} + W_{S_2} = 586 + 828$
$W_{T_2} = 1{,}414$ lbs. (641 kg)

FIG. 17C

- Find Force Required for Upward Compression Stroke.

$F_{TU} = F_L + W_{T_2}$
$F_{TU} = 4883$ lbs. + 2432 lbs.
$F_{TU} = 7{,}315$ lbs. (3,318 kg)

FIG. 17D

- Find Pressure (in W.C.) for Upward Compression Stroke.

$$P_U = \frac{F_{TU}}{A_{P2}} \times 28 \text{ inches/lb.}$$

$$P_U = \frac{7315 \text{ lb.}}{9764 \text{ in}^2} \times 28 = 21.0 \text{ inches (53.3 cm) W.C.}$$

FIG. 17E

- Find Force Required for downward Compression Stroke.

$$F_{TD} = F_L - W_T - W_{T2}$$

$$F_{TD} = 4883 - 878 - 2432 = 1,573 \text{ lbs. (714kg)}$$

FIG. 17F

- Find Pressure (in W.C.) for Downward Compression Stroke.

$$P_D = \frac{F_{TD}}{A_{P2}} \times 28 \text{ inches/lb.}$$

$$P_D = \frac{1573 \text{ lbs.}}{9764 \text{ in}^2} \times 28 \text{ inches/lb.} = 4.51 \text{ inches (11.5 cm) W.C.}$$

FIG. 17G

- Find Neutral Pressure (in W.C.) in Closed air Column.

$$P_N = \frac{W_T + W_{T2}}{A_{P2}} \times 28 \text{ in/lb.} = \frac{878 + 2432}{9164} \times 28 = 10.1 \text{ in (25.7cm) W.C.}$$

FIG. 17H

WAVE ENERGY ELECTRICAL POWER GENERATION

This application is a continuation-in part of U.S. application Ser. No. 13/375,921, filed Dec. 2, 2011, now pending, which is a PCT National Stage of International Application No. PCT/US2010/037682, filed Jun. 8, 2010, now expired, which claims priority from U.S. Provisional Application No. 61/185,413, filed Jun. 9, 2009, and U.S. Provisional Application No. 61/243,328, filed Sep. 17, 2009. The complete disclosures of all of these documents are incorporated herein by reference.

TECHNICAL FIELD

This disclosure relates to wave-energy conversion devices, and more particularly to devices for conversion of wave energy to generation of electrical power.

BACKGROUND

Devices for generation of electrical power by conversion of wave energy are known, e.g., from Wells U.S. Pat. No. 4,383,413; from Houser et al. U.S. Pat. No. 5,411,377; from Fredriksson et al. U.S. Pat. No. 6,140,712; from Hirsch U.S. Pat. No. 7,199,481; and from Buffard et al. U.S. Pat. No. 7,781,903.

SUMMARY

According to one aspect of the disclosure, a wave energy electric power generation system comprises: a buoyant body responsive to vertical wave movement and an associated, relatively vertically stationary body; a working compressor comprising a compressor cylinder and a compressor piston, the compressor piston being mounted for reciprocal movement relative to the compressor cylinder to alternately compress air in opposed air compressor chambers; a pressure regulator comprising a pressure regulator tank defining a regulator chamber in communication with the compressor cylinder for alternately receiving compressed air from each of the opposed air compression chambers, a floating piston disposed within the pressure regulator tank and mounted to apply pressure to compressed air received into the regulator chamber, and a pressure controller coupled to the floating piston for controlling pressure applied by the floating piston to compressed air in the regulator chamber and an hydraulic dampening system coupled to the floating piston for restricting unwanted vertical oscillations of the floating piston, for output of a continuous flow of compressed air at relatively constant pressure; and an air turbine and generator set disposed in communication with the pressure regulator for receiving the output of the flow of compressed air from the pressure regulator at relatively constant pressure to rotate the air turbine to drive the generator for generation of electric power.

Implementations of this aspect of the disclosure may include one or more of the following features. The compressor further comprises a pair of rolling diaphragms extending between the compressor piston and an opposed wall of the compressor cylinder to permit efficient, almost frictionless reciprocal movement of the compressor piston relative to the compressor cylinder to alternately compress air in the opposed air compression chambers. The pressure regulator further comprises a pair of rolling diaphragms extending between the floating piston and an opposed wall of the pressure regulator tank to permit efficient, almost frictionless reciprocal movement of the floating piston relative to the pressure regulator tank. The associated, relatively vertically stationary body comprises a relatively vertically stationary neutral buoyancy piston, the compressor cylinder is mounted for vertical movement with the buoyant body, and the compressor piston is mounted to the relatively vertically stationary neutral buoyancy piston. The compressor cylinder is mounted to a buoyant body for vertical movement responsive to vertical wave movement upon a surface of water, and the compressor piston is mounted to an associated, relatively vertically stationary neutral buoyancy piston.

Other implementations of this aspect of the disclosure may include one or more of the following features. The associated, relatively vertically stationary body comprises a land or shoreline mounting, the compressor cylinder is disposed upon the land or shoreline mounting, and the compressor piston is mounted to the buoyant body responsive to vertical movement of a surface of a body of water. The buoyant body is disposed upon a volume of pressurized air responsive to vertical movement of a surface of a body of water. The buoyant body is disposed upon a closed column of pressurized air responsive to reciprocating movement of surface of a water, and the system further comprises an air handler in communication with the closed column of pressurized air and adapted for increasing and reducing the mass of air within the closed column for adjustment of the baseline position of the buoyant body with changes in tide. In a land or shoreline placement, the compression cylinder comprises upper and lower opposed circular, open-ended cylindrical elements defining upper and lower compression chambers, and the compressor piston and a first circular open-ended cylindrical element each defines a circular liquid trough containing a sealant liquid, the circular liquid trough defined by the piston being sized and arranged to receive a rim wall of the upper circular, open-ended cylindrical element in sealing engagement with the sealant liquid during alternating compression and suction strokes, and a circular liquid trough defined by the lower circular open-ended cylindrical element being sized and arranged to receive a rim wall of the piston element in sealing engagement with the sealant liquid during alternating suction and compression strokes. A compression stroke of the compressor piston creates compression or pressure of about +20 inches (+50.8 cm) W.C. The associated liquid trough contains a sealant liquid having a specific gravity of approximately 1.0 and provides a sealing depth of at least about 20 inches (50.8 cm). A suction stroke of the compressor piston creates suction of about −3 inches (−7.6 cm) W.C. The associated liquid trough contains a sealant liquid having a specific gravity of approximately 1.0 and provides a sealing depth of at least about 3 inches (7.6 cm).

Still other implementations of this aspect of the disclosure may include one or more of the following features. The wave energy electric power generation system further comprises a buoyant body in the form of a lift piston disposed for vertical reciprocating movement in a piston cylinder, the piston cylinder comprises upper and lower opposed circular, open-ended cylindrical elements defining upper and lower piston chambers, and the upper and lower circular open-ended cylindrical elements together define a circular liquid trough containing a sealant liquid, the circular liquid trough defined by the upper and lower circular, open-ended cylindrical elements being sized and arranged to receive a rim wall of the lift piston in sealing engagement with the sealant liquid during reciprocating vertical movement of the lift piston. The upper piston chamber is in communication with an external ambient atmosphere. The lower piston chamber is in communication with a closed column of pressurized air responsive to vertical wave movement. The buoyant body is disposed upon a closed column of pressurized air responsive to reciprocating movement of surface of a water, and the system further comprises an air handler in communication with the closed column of pressurized air and adapted for adjusting the mass of air within the closed column for adjustment of the baseline position of the buoyant body with changes in tide. The air handler comprises an air pump for increasing the mass of air contained within the closed column of air. The air handler comprises an air relief valve for decreasing the mass of air contained within the closed column of air.

According to another aspect of the disclosure, a wave energy electric power generation system comprises: a buoyant body responsive to vertical wave movement upon a surface of water and an associated, relatively vertically stationary neutral buoyancy piston; a working compressor comprising a compressor cylinder mounted for vertical movement with the buoyant body, a compressor piston mounted to the relatively stationary neutral buoyancy piston, and a pair of rolling diaphragms extending between the compressor piston and an opposed wall of the compressor cylinder to permit efficient, almost frictionless reciprocal movement of the compressor piston relative to the compressor cylinder to alternately compress air in opposed air compression chambers; a pressure regulator comprising a pressure regulator tank defining a regulator chamber in communication with the compressor cylinder for alternately receiving compressed air from each of the opposed air compression chambers, a floating piston disposed within the pressure regulator tank and mounted to apply pressure to compressed air received into the regulator chamber, a pressure controller coupled to the floating piston for controlling pressure applied by the floating piston to compressed air in the regulator chamber and an hydraulic dampening system coupled to the floating piston for restricting unwanted vertical oscillations of the floating piston, for output of a continuous flow of compressed air at relatively constant pressure, and a pair of rolling diaphragms extending between the floating piston and an opposed wall of the pressure regulator tank to permit efficient, almost frictionless reciprocal movement of the floating piston relative to the pressure regulator tank; and an air turbine and generator set disposed in communication with the pressure regulator for receiving the output of the flow of compressed air from the pressure regulator to rotate the impulse air turbine to drive the generator for generation of electric power.

Implementations of either of the above aspects of the disclosure may include one or more of the following features. The pair of rolling diaphragms extending between the compressor piston and an opposed wall of the compressor cylinder defines a closed compressor region, and the system further comprises a vacuum pump in communication with the closed compressor region. The vacuum pump depressurizes the closed compressor region to a predetermined pressure. The predetermined pressure is of the order of −6 inches (−15.2 cm) W.C. The pair of rolling diaphragms extending between the floating piston and an opposed wall of the regulator tank defines a closed regulator region, and the system further comprises a vacuum pump in communication with the closed regulator region. The vacuum pump depressurizes the closed regulator region to a predetermined pressure. The predetermined pressure is of the order of −6 inches (−15.2 cm) W.C. 27. The wave energy generation system further comprises a closed air system comprising a reservoir for receiving, storing and delivering a closed system of air, and a system of conduits for delivery of air among the compressor, the pressure regulator, the air turbine, and the reservoir. The reservoir comprises a flexible bladder defining a volume for receiving, storing and delivering the closed system air, and a tank containing the bladder and defining an ambient air region external of the bladder. The system of conduits comprises check valves for controlling the direction of air flow into the compressor, and from the compressor to the pressure regulator and/or to the air turbine. The check valves comprise check valve assemblies comprising opposed plates mounted for reciprocating closed-to-open-to-closed travel under control of a double spring flexure assembly, the opposed plates defining opposed sealing surfaces and offset air flow regions in communication and defined by opposed sloped sealing surfaces. The opposed sloped sealing surfaces are sealed by flexible seal rings. The pressure regulator and the compressor are in communication through a compressed air conduit. The compressed air conduit comprises check valves for controlling the direction of air flow into the compressor and from the compressor to the pressure regulator and/or to the air turbine. The check valves comprise check valve assemblies comprising opposed plates mounted for reciprocating closed-to-open-to-closed travel under control of a double spring flexure assembly, the opposed plates defining opposed surfaces of alternating, generally concentric rings of conical ridge surfaces and conical valley surfaces, the conical valley surfaces defining air flow regions. The conical ridge surfaces further comprise flexible seal rings disposed during closing motion for initial engagement with opposed conical valley surfaces. The wave energy generation system further comprises an air pump. The hydraulic dampening system comprises a piston (107, FIG. 9) coupled with the floating piston and responsive to vertical velocity of the floating piston within the pressure regulator chamber for controlling flow rate of hydraulic pressure fluid to the piston, for restricting unwanted vertical oscillations of the floating piston. The compressor piston is mounted in the compressor cylinder upon a central rod having, above and/or below, the compressor piston, a flat-sided, e.g., square cross-section portion engaged in a corresponding square aperture, e.g., formed by the opposed surfaces of two pairs of opposed rollers, e.g. bearing supported rollers, for resisting relative rotation between the compressor piston and the compressor cylinder. The wave energy electric power generation system further comprises a guidance system for the central rod of the compressor piston, the guidance system comprising one or more pairs of opposed rollers disposed in engagement with opposite surfaces of one or more of flat-sided cross-section portions. The one or more flat-sided cross-section portions and the corresponding flat-sided aperture are square. The floating piston is mounted in the regulator tank upon a central rod having, on at least one side, and up to four sides, of the floating piston, a flat-sided, e.g. square, cross-section portion engaged in a corresponding square aperture, e.g., formed by the opposed surfaces of two pairs of opposed rollers, e.g. bearing supported rollers, for resisting relative rotation between the floating piston and the regulator tank. The wave energy electric power generation system further comprises a guidance system for the central rod of the floating piston comprising one or more pairs of opposed rollers disposed in engagement with opposite surfaces of one or more of flat-sided cross-section portions. The flat-sided cross-section portion and the flat-sided aperture are square. Other methods to prevent rotation of the piston within the cylinder, such as a sliding shaft key or a single flat, may also be used in the alternative. The wave energy electric power generation system further comprises means for transmission of generated electrical power for consumption at a remote location. The wave energy electric power generation system further comprises a hydraulic shock absorber arrangement comprising a snubber piston member and an opposed member defining a snubber cavity of cooperating configuration and containing a hydraulic fluid, one of the snubber piston and the opposed snubber cavity being mounted to the buoyant body and the other of the snubber piston and the opposed snubber cavity being mounted to the associated, relatively vertically stationary body, both in relative positions for shock absorbing engagement in a predetermined region corresponding to one of an upper end and a lower end of a range of relative motion between the buoyant body and the associated, vertically stationary body. The hydraulic shock absorbing arrangement comprises: a first snubber piston member and a first opposed member defining a snubber cavity of cooperating configuration and containing a hydraulic fluid mounted in relative positions for shock absorbing engagement in a predetermined region corresponding to the upper end of the range of motion between the buoyant body and the associated, vertically stationary body, and a second snubber piston member and a second opposed member defining a snubber cavity of cooperating configuration and containing a hydraulic fluid mounted in relative positions for shock absorbing engagement in a predetermined region corresponding to the lower end of the range of motion between the buoyant body relative and the associated, vertically stationary body. The first snubber piston member and the second snubber piston member are mounted at opposite ends of the associated, vertically stationary body, and the opposed member defining the first snubber cavity and the opposed member defining the second snubber cavity are mounted to a surface of the buoyant body above and below the associated, vertically stationary body.

The disclosure thus features an improved wave energy electrical power generation system suited for operation of single or multiple units on a buoyant body and on shore. Effective and efficient sealing, e.g. of a closed air system, may be provided between moving elements of the system compressor and/or the system pressure regulator using a pair of rolling diaphragm seals, e.g. with the seal region under vacuum, or using liquid sealant in circular liquid seal troughs. Compressed air delivered alternately from opposite chambers of the compressor is delivered into the pressure regulator, and the pressure regulator, which may include a pressure controller and/or an hydraulic dampening system, in turn delivers a continuous flow of compressed air at relatively constant pressure to an air turbine for driving an associate generator. Systems for accommodating or adjusting to changes in water surface level due to tidal changes are also provided.

The details of one or more implementations of the disclosure are set forth in the accompanying drawings and the description below. Other features, objects, and advantages of the disclosure will be apparent from the description and drawings, and from the claims.

DESCRIPTION OF DRAWINGS

FIG. 1 is a somewhat diagrammatic representation of one implementation of a wave energy electrical power generation system of the disclosure, while

FIGS. 3 and 3A are side and top section views, respectively, of the air compressor of FIG. 2, showing inter-engagement of a square shaft and square orifice, for resisting rotational movement of the piston relative to the compressor cylinder, where FIG. 3A is taken at the line 3A-3A of FIG. 3.

FIG. 4 is a face view of a check valve assembly of the disclosure, while FIG. 4A is a side section view of the check valve assembly taken at the line 4A-4A of FIG. 4; FIG. 4B is an enlarged side section view of a region of the opposed plates of the check valve assembly taken at the line 4B-4B of FIG. 4; and FIG. 4C is a still further enlarged section view of a conical sealing surface and seal of one opposed plate of the check valve assembly.

FIG. 8A-1 is a somewhat diagrammatic perspective view of a cylindrical rolling diaphragm, while FIGS. 8A-2 through 8A-4 are somewhat diagrammatic views respectively showing a face view of a rectangular sheet that forms the cylindrical rolling diaphragm (FIG. 8A-2), an end view of the rectangular sheet with extruded bead elements, formed, e.g. of urethane, welded along the top and bottom edges of the rectangular sheet (FIG. 8A-3); and a section view of the cylinder with the lower edge region stretched circumferentially and rolled onto the inner surface (FIG. 8A-4) (to form the rolling diaphragm.

FIGS. 9 and 9A are side and top section views showing inter-engagement of a square shaft and square orifice, e.g. of the pressure regulator of the power generation system of FIG. 1 (and also for the compressor), for resisting rotational movement of the floating piston relative to the regulator tank. FIG. 9B is a side section view of the vacuum inlet through the tank wall.

FIG. 10 is a somewhat diagrammatic representation of still another implementation of a wave energy electrical power generation system of the disclosure, while

Like reference symbols in the various drawings indicate like elements.

DETAILED DESCRIPTION

Figure 1:
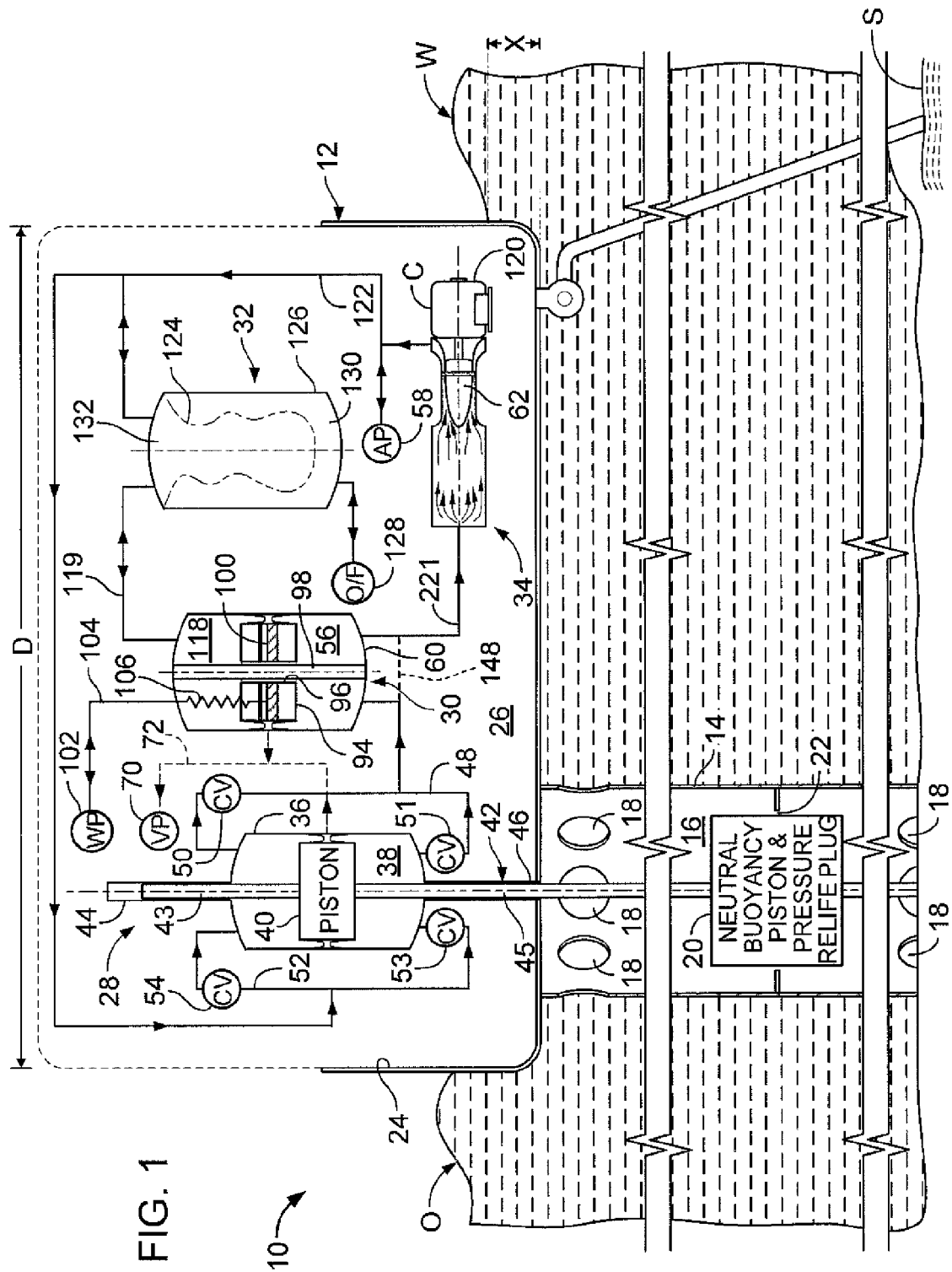

Referring to FIG. 1 et seq., a wave energy electrical power generation system 10 of the disclosure has a large floating buoy 12, having a diameter, D, e.g. about fifteen feet, anchored to the sea floor, S. A cylindrical wall 14 extends below the buoy 12 to define a close-fitting chamber 16. The chamber wall defines a plurality of open water flow orifices 18 above and below a neutral buoyancy piston 20, which is positioned in the region of a narrow plug orifice 22 in a relatively vertically stationary position.

An upper body portion 24 of the floating buoy 12 defines a chamber 26, within which are disposed the components of the system 10 for conversion of wave energy for generation of electricity, including an air compressor 28, a pressure regulator 30, a closed air reservoir 32, and an air turbine and generator set 34.

Briefly, motion of the ocean surface waves, W, causes the floating buoy 12 to rise and fall, while the neutral buoyancy piston 20 remains relatively vertically stationary. The air compressor 28 has a closed tank or cylinder 36, which is fixedly mounted to the floating buoy 12 within the chamber 26, and also rises and falls with movement of the floating buoy in response to motion of the ocean waves. The cylinder 36 defines a compressor chamber 38, within which is disposed a compressor piston 40. The compressor piston is mounted to a central rod 42, which is connected at its lower end to the neutral buoyancy piston 20 that is maintained relatively vertically stationary (i.e., as opposed to the rising and falling wave motion of the floating buoy and the compressor cylinder).

Figure 2:
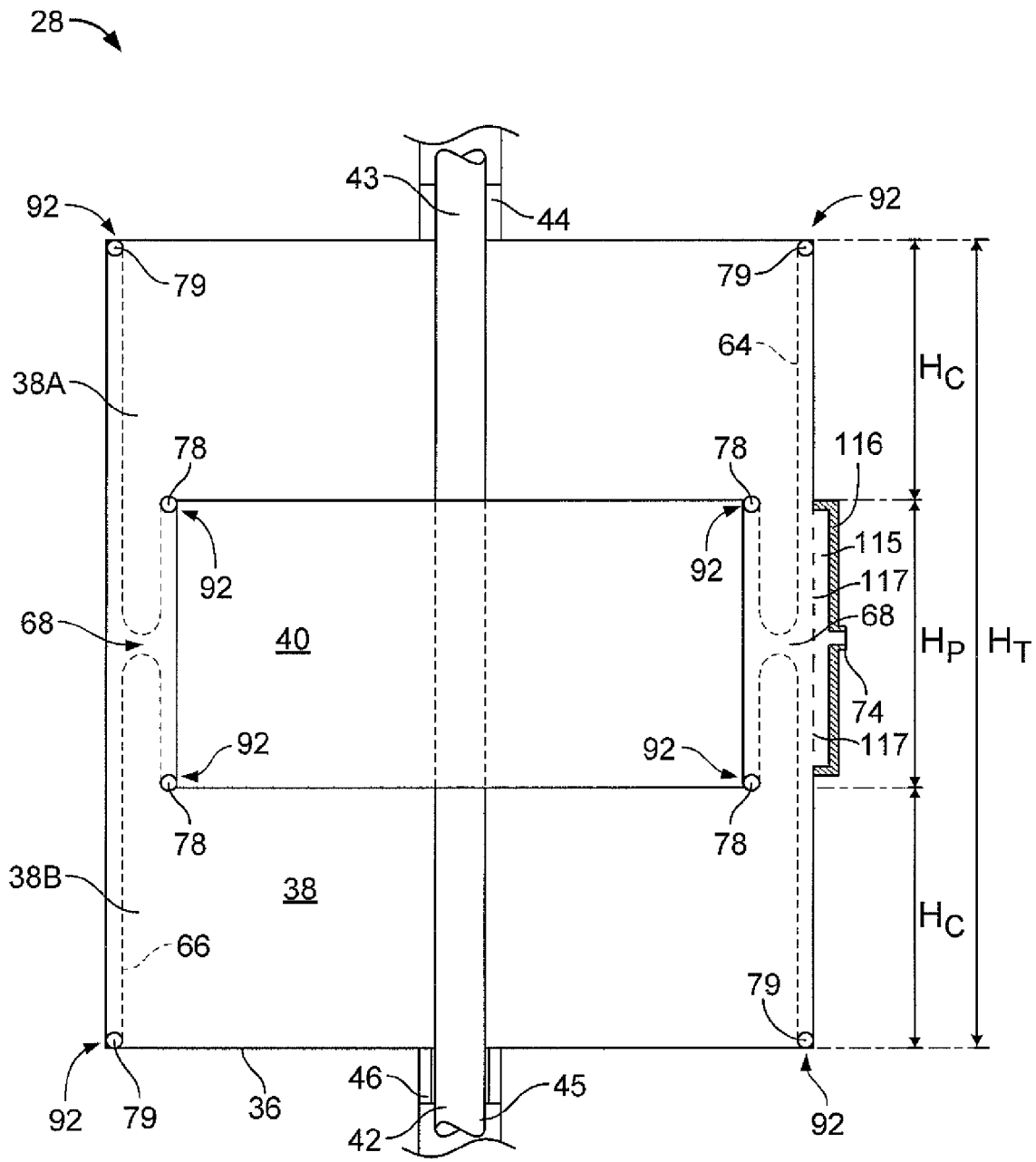
FIG. 2 is a somewhat diagrammatic side plan view of the air compressor of the power generation system of FIG. 1, with a piston mounted to a central rod for vertical movement relative to a cylinder, and the piston and cylinder sealed together by depressurized rolling diaphragms.
Figure 8:
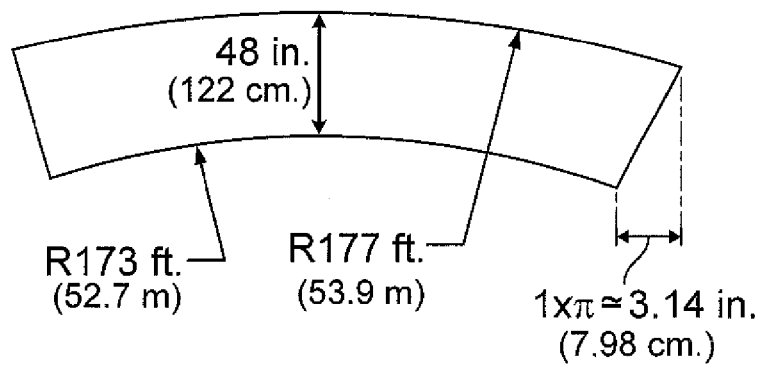
FIG. 8 represents a sample calculation of the radius dimensions of the top/outer rim and the bottom/inner rim of the rolling diaphragms.
Figure 8:
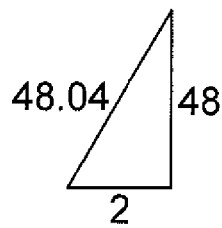
Figure 8:
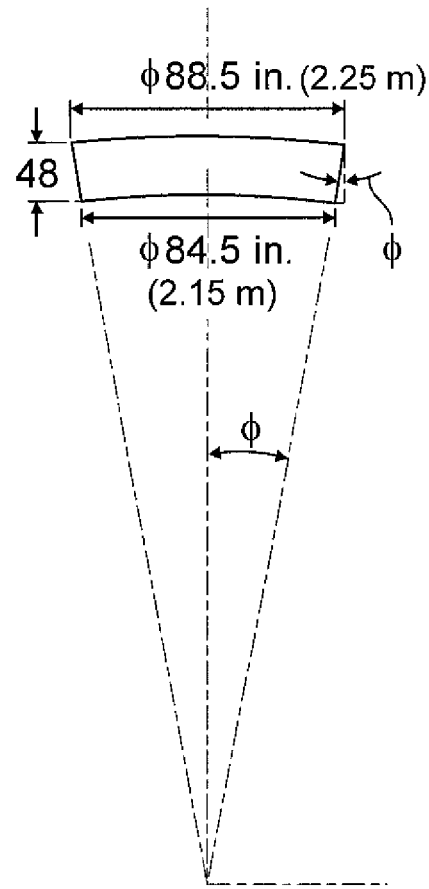
Figures 1, 8A:
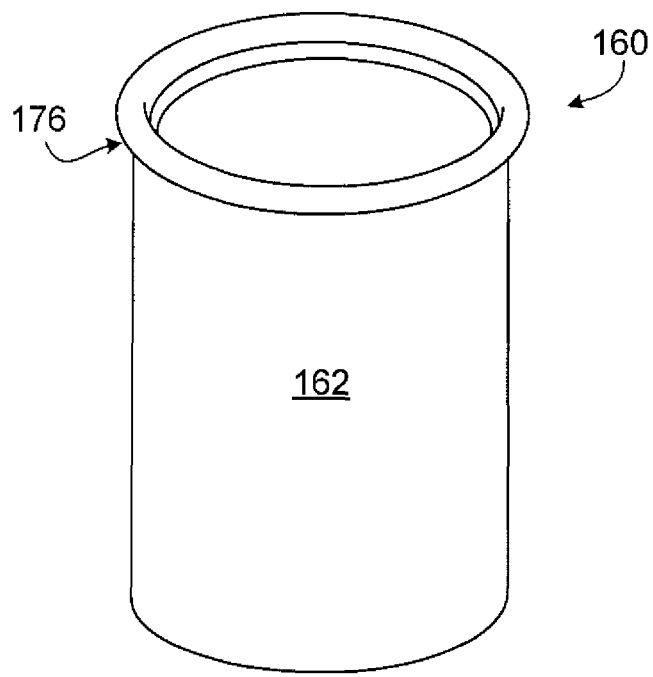
Figures 2, 8A:
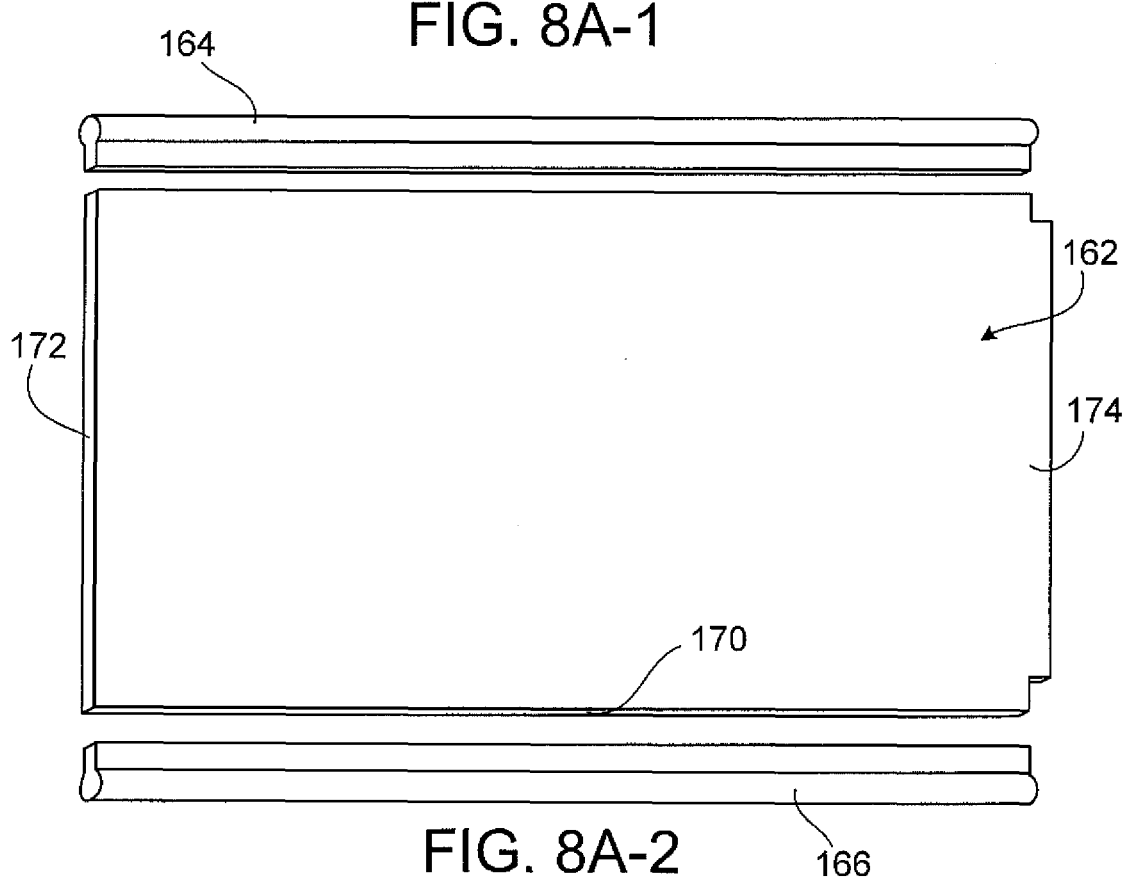
Figures 3, 8A:
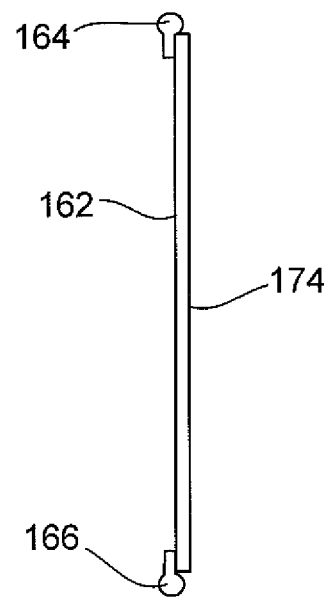
Figures 4, 8A:
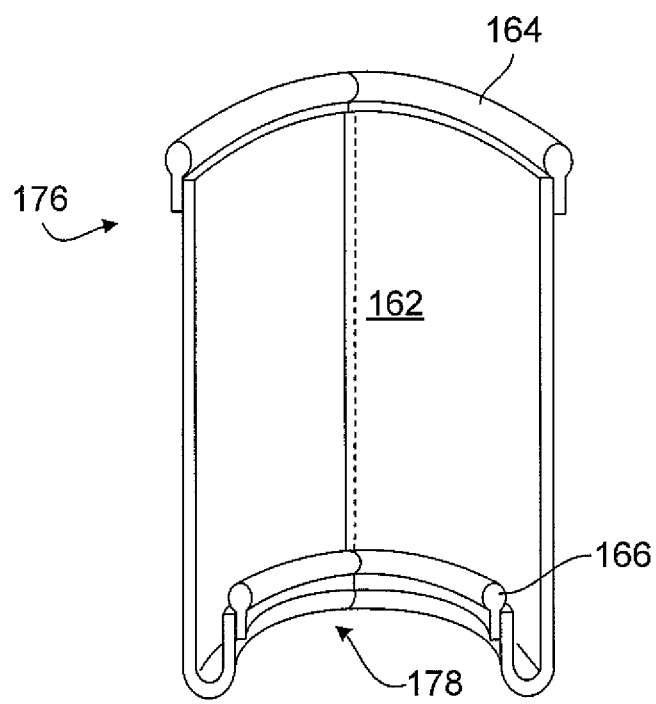

Referring also to FIGS. 2, 3, and 3A, the central rod 42, at its upper end 43, is received within a closed tube 44 at the top of the cylinder 36, to provide an air seal. The rod end 43 and tube 44 may both be square in cross-section, thereby to resist rotation of the piston 40 relative to the cylinder 36. The lower end 45 of the central rod 42 extends through a tube 46 at the bottom of the cylinder 36. This lower tube 46 is open, but is provided with water and air sealing (e.g., see alternative means for air sealing described below with reference to FIGS. 10 and 16). In one implementation, the compressor piston 40 has a vertical height, $H_P$, e.g. of 4 feet, 6 inches (1.37 m), with vertical clearance, $H_C$, e.g. of 4 feet (1.22 m), from each of the top and bottom ends of the compressor cylinder 36 when the system is at rest, e.g. in calm conditions, and the compressor chamber has a height, $H_T$, e.g. of 12 feet, 6 inches (3.81 m). Hydraulic shock absorbers (described below, e.g., with reference to FIG. 10) may also be provided to resist unwanted impact of the compressor piston 40 with the top and bottom ends of the cylinder 36, e.g. during periods of heavier weather.

Figure 1A:
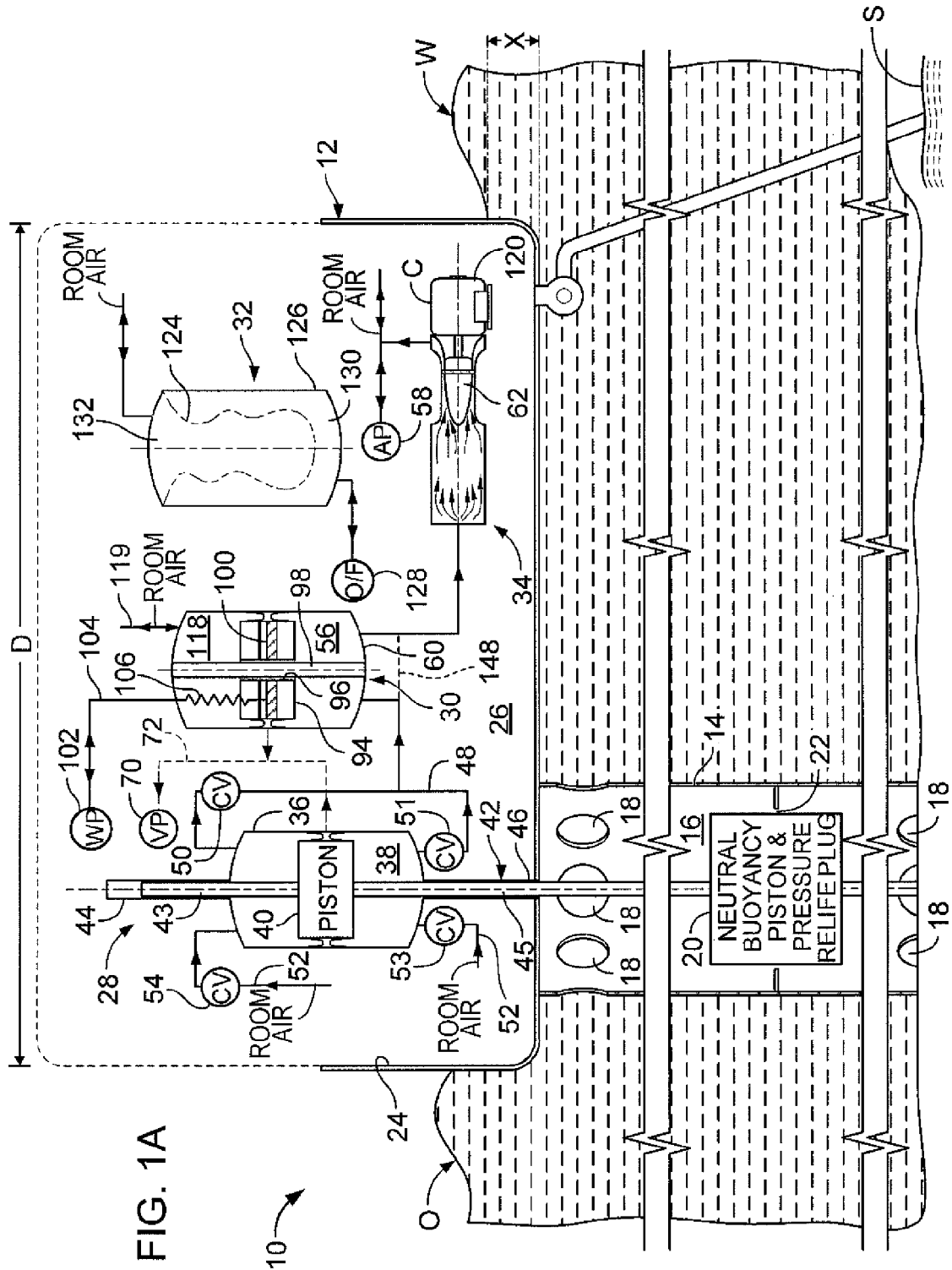
FIG. 1A is a somewhat diagrammatic representation of another implementation of a wave energy electrical power generation system of the disclosure.

Movement of the compressor piston 40 relative to the compressor cylinder chamber 38, i.e. reciprocal vertical movement of the compressor piston within the compressor chamber, alternately compresses the volumes of air contained within the upper chamber portion 38A and the lower chamber portion 38B of the chamber 38 of the compressor cylinder 36, in turn. The volume of air within the chamber portion under compression is delivered via compressed air conduit 48, through check valve 50 or 51 (e.g., with +3 inch (+7.6 cm) W.C. cracking pressure) into the lower chamber 56 of the pressure regulator tank 60 (or, via conduit 148 (indicated in dashed line in FIG. 1), directly to the air turbine 62 of the air turbine and generator set 34). Simultaneously, air from flexible bladder 124 of the closed air reservoir 32 and/or spent air pumped by air pump 58 from the air turbine 62 of the air turbine and generator set 34 may be delivered into the opposed chamber portion of the compressor cylinder 36 via air inlet conduit 52 through check valve 53 or 54 (also, e.g., with +3 inch (+7.6 cm) W.C. cracking pressure). In another implementation, shown in FIG. 1A, air from flexible bladder 124 of the closed air reservoir 32 and/or outside ambient air pumped by air pump 58 may be delivered into or out of the space 26 to match external barometric pressure. Also, "room" air flows through check valve 53 or 54 (also, e.g., with +3 inch (+7.6 cm) W.C. cracking pressure) with each suction stroke of piston 40, and ambient air oscillates into and out of space 130 within the bladder tank 32 in response to air movement inside bladder 124.

Figure 4:
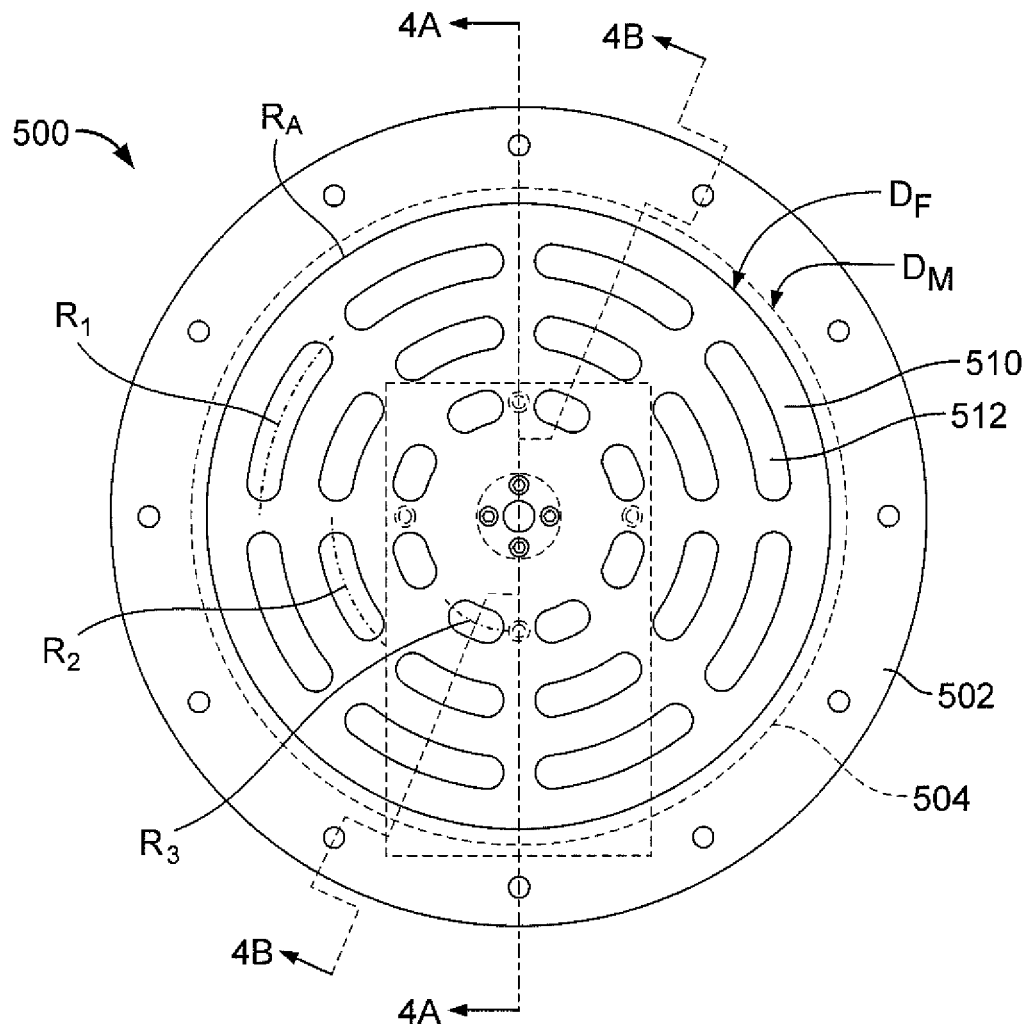
Figure 5:
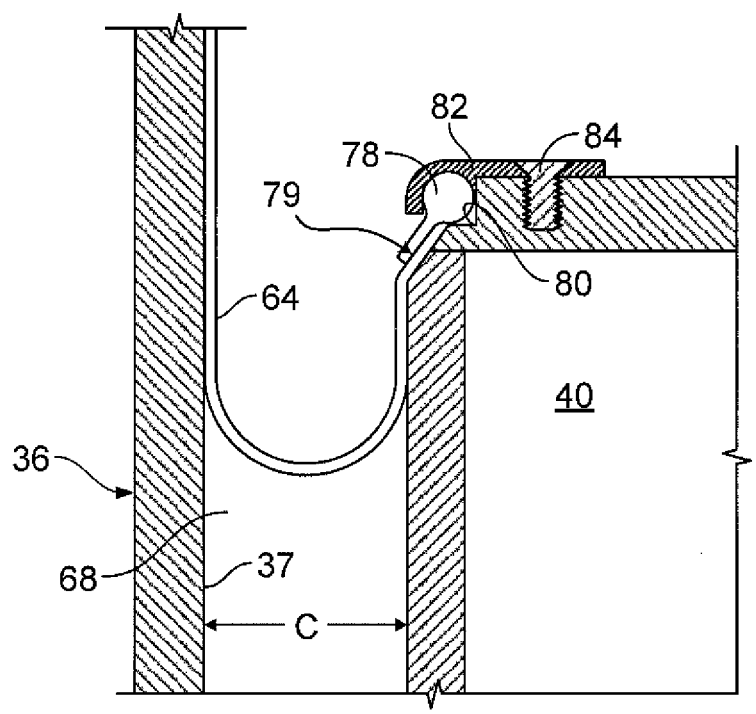
FIGS. 5 and 5A are side section views of alternative clamping arrangements for mounting, e.g., an inner rim of an upper rolling diaphragm to the piston, for extending between the piston and the cylinder within the volume of the compressor.
Figure 5A:
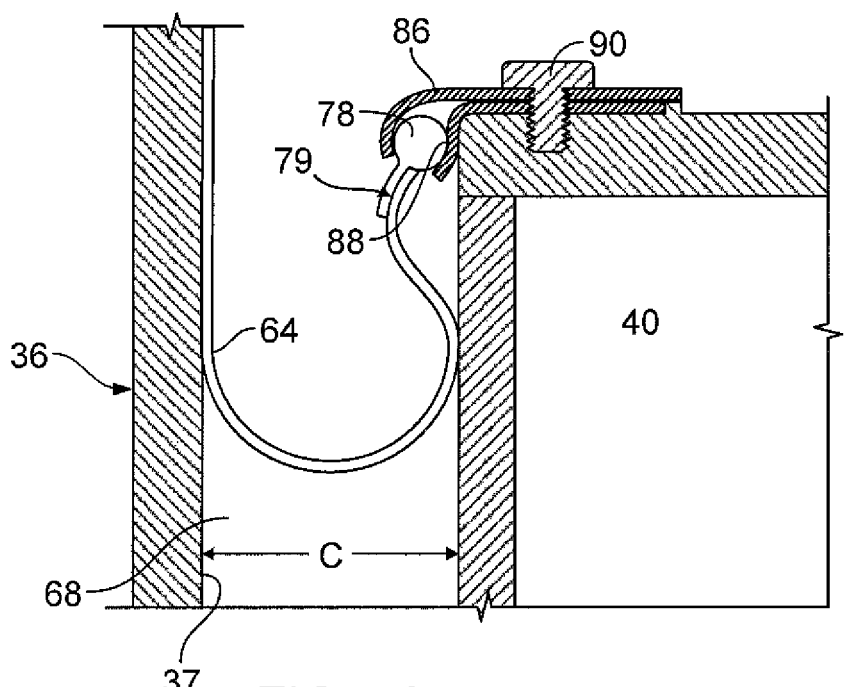

Referring to FIGS. 4, 4A, 4B, and 4C, in one implementation, each of the check valve assemblies 50, 51, 53, 54 described above has the form of a check valve assembly 500 disposed for control of air flow into and out of the wave energy compressor 36. The check valve assembly 500 consists of opposed plates 502, 504, e.g. of aluminum. Plate 504 is mounted for reciprocating close-to-open-to-close travel relative to plate 502 under the control of a double spring steel flexure assembly 506 is securely fastened to plate 502 with fixed attachment to shaft 508 (e.g. 1.5 lbs.). The respective opposed plates 502, 504 define opposed sets of alternating, generally conical (i.e. v-shaped in cross-section) ridges 514 and valleys 515, formed of intersecting, conical surfaces, both extending in alternating concentric circles of stepped diameter about the axes of the opposed plate, with the valleys defining open air flow regions 516. For example, an outer ring defining the conical ridge surface 514 of plate 502 is indicated in FIG. 4, with an immediately inner ring defining the conical valley region with an air flow region 512. Referring also to FIG. 4B, the relationship of the alternating rings of conical ridges 514 and rings of valleys 515 defining air flow regions 516 of plate 502 with the counterpart alternating rings of conical ridges 514 and rings of conical valleys 515 defining air flow regions 516 of opposed plate 504 is shown. Referring also to FIG. 4C, flexible die cut rings of polyurethane sheet 518 (e.g. an 80 durometer sheet, steel die cut) are mounted between the plates 504 and the rings of conical ridges 514 (e.g. generally in a plane of the plate 504), with the opposite tips of the inner and outer edges of each die cut ring exposed beyond the adjacent surface of the ridge to a position to come into contact with the opposed surfaces of the opposite rings of the opposite valley regions 515 of the opposed plate 502, before the surfaces of the opposed conical ridges 514 and conical valleys 516 come into contact. This arrangement will consistently control the parallel surface flatness of the opposed plates 502, 504, as required for good sealing when the check valve assembly is in the closed condition, e.g. as shown in section 4A-4A of FIG. 4A. The flexures 520 of double spring steel flexure assembly 506 are designed to provide at least 20 years of continuous operation, based on the load supported and the valve travel clearance requirements, $V_T$, e.g. 0.562 inch valve open clearance and 0.000 inch valve closed clearance. The absence of sliding surface guidance in the instant assembly design avoids the need for lubrication. The assembly design also includes an adjustable compression spring 522, positioned on the shaft connection 508 between the flexure assembly 506 and the moving valve disc 504, to adjust the valve cracking point to the desired pressure differential. Cracking pressure spring adjustment also compensates for weight of the moving plate where it is rotated to compensate for gravity effects. By way of example only, the check valve assembly 500 is represented in the drawings with a moveable valve disk 504 (e.g. 12.60 lbs.) having a diameter $D_M$ (e.g., 16.000 inches) and a fixed valve disk 502 having a diameter $D_F$ (e.g., 15.250 inches). The check valve assembly 500 has a total open area, i.e. for flow of air through communicating open regions of plates 502, 504 (indicated in FIG. 4A by arrows, P), of 69.64 square inches equal, e.g., to a 9.41 inch diameter duct (for example, circumferential region $R_A$ has a single opening of 18.41 square inches; circumferential region $R_1$ has eight openings of 26.07 square inches in total; circumferential region $R_2$ has eight openings of 16.94 square inches in total; and circumferential region $R_3$ has eight openings of 8.22 square inches in total). It will be understood that other diameter check valve assemblies, e.g. 24 inch diameter, are contemplated and may be implemented according to this disclosure.

Figure 6:
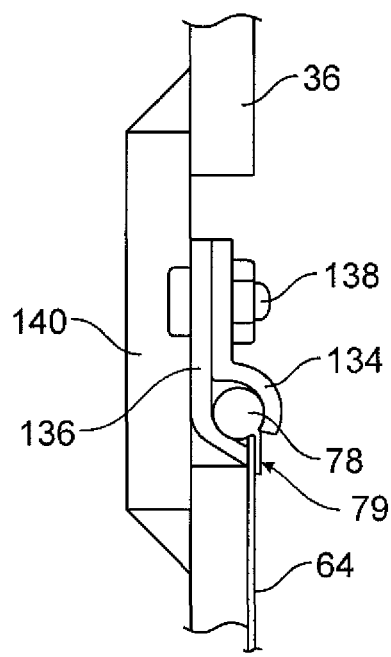
FIG. 6 is a similar side section view of a clamping arrangement for mounting an outer rim of the upper rolling diaphragm to the cylinder, again, for extending between the piston and the cylinder within the volume of the compressor.

Referring also to FIGS. 2, 5, 5A, and 6, upper and lower flexible rolling diaphragms 64, 66, respectively, e.g. 0.030 inch (0.76 mm) thick urethane, are mounted to extend between the compressor piston 40 and the wall 37 of the compressor cylinder 36. For example, referring to FIGS. 5 and 5A, in a first implementation, an inner/bottom rim 78 of the rolling flexible diaphragm 64 is engaged in a notch 80 defined in the upper wall surface of the piston 40, and secured with a clamp ring 82 by bolts 84 (one is shown). In another implementation, shown in FIG. 5A, the inner/bottom rim 78 of the rolling flexible diaphragm 64 is engaged between clamp rings 86, 88 secured by bolts 90 (again, one is shown) to the surface of the piston. In FIG. 6, the outer/top rim 79 of the rolling flexible diaphragm 64 is engaged between clamp rings 134, 136 secured by bolts 138 (again, one is shown) in a recess defined by an access plate 140 secured to the wall of the compressor cylinder 36. Referring again to FIG. 2, these or other clamp rings or similar elements 92 of suitable design and operation may be employed to secure the inner/bottom rims 78 and the outer/top rims 79 of the upper and lower flexible rolling diaphragms 64, 66 in sealing engagement with the compressor piston 40 and with the compressor cylinder 36, respectively. The outer/top rims of the flexible rolling diaphragms may also be secured to the compressor cylinder at locations other than as shown, e.g., in FIG. 2.

Figure 7:
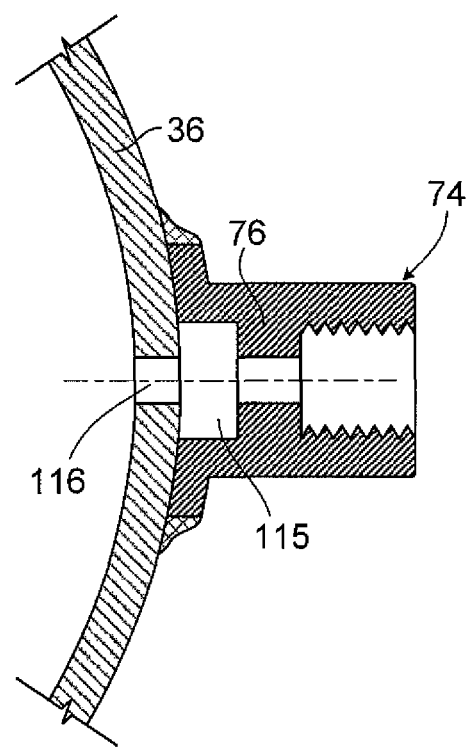
FIG. 7 is a side section view of a vacuum inlet through the cylinder wall, for depressurizing the region between the piston and the cylinder, bounded by the upper and lower rolling diaphragms.

The rolling flexible diaphragms 64, 66 thus permit efficient, almost frictionless reciprocal movement of the piston 40 within the cylinder 36, without loss of pressure. The sealed region 68 defined by the flexible diaphragms 64, 66 between the wall 37 of the cylinder 36 and the opposed surface of the piston 40, maintained at −6 inches (−15.2 cm) W.C. by vacuum pump 70 acting through conduit 72, and thereafter acting through vacuum port 74 (FIG. 7) and vacuum distribution holes 76 (FIG. 3) in the wall 37 of the compressor cylinder 36, serves to resist collapse of the rolling diaphragm seal during a suction stroke. It also maintains seal shape, e.g. when system air pressure falls to atmospheric conditions when the sea is calm. Use of the flexible rolling diaphragms 64, 66 also eliminates the need for machined surfaces held to tight dimensional tolerances. For example, the surfaces and tolerances of compressor 28 (and pressure regulator 30) may only need to be those typically produced in the manufacture of above ground storage tanks of similar size, and vacuum space clearance, C (FIG. 5), e.g. two inches (5.1 cm), may be maintained between the opposed surfaces of the compressor cylinder 36 and the piston 40. A sample calculation of the radius dimension of the inner (or bottom) rim 78 and the outer (or top) rim 79 of the rolling diaphragm may be seen in FIG. 8.

Referring to FIGS. 8A-1 through 8A-4, in another implementation, a cylindrical rolling diaphragm 160 (FIG. 8A-1) is formed of a rectangular sheet 162, e.g. of urethane or other suitable material, joined with extruded upper and lower bead elements 164, 166, e.g. also of urethane, by ultrasonic welding along the top and bottom edges 168, 170 (FIGS. 8A-2 (front view) and 8A-3 (end view)). The opposite side edges 172, 174 are the joined, e.g. by ultrasonic welding, to form a cylindrical shape (e.g., the side edges 172, 174 are approximately 48 inches, and the width of the sheet 162, i.e. along the top and bottom edges 168, 170 is selected to form a cylinder with a diameter equal to the diameter of the compressor piston 40 (FIG. 2)). The upper edge (region 176, FIG. 8A-4) is then stretched circumferentially for attachment to the chamber wall (opposite to the piston cylinder), while the lower edge (region 178, FIG. 8A-4) is rolled inwardly for attachment to the wall of the piston, thereby to form the rolling diaphragm (e.g. as shown in FIG. 2).

Referring now to FIGS. 1, 9, and 9A, in the lower chamber 56 of the pressure regulator tank 60, compressed air from the compressor 28 is maintained under pressure by floating or roof piston 94, which is mounted within the regulator tank 60 on vertical rod 98. The piston 94 is fixedly mounted to the rod, thus to resist leakage of compressed air from the lower chamber through any aperture between the piston 94 and the rod 98. The regulator tank vertical rod is supported by upper and lower bearing supports and by spherical roller bearings 96. The level of pressure within the lower chamber of the regulator tank is controlled by regulation of the volume, i.e. weight, of water in the variable volume water ballast tank 100, which is delivered to, or removed from, the piston 94 by the water pump 102, through water conduit 104 and hose 106 (which is shown coiled to accommodate vertical movement of the floating piston 94), facilitating output of a continuous flow of compressed air at relatively constant pressure.

The floating piston is baffled internally (not shown) to resist sloshing of water within the ballast tank 100 as the floating buoy 12 rocks back and forth due to wave action. This arrangement assists in ensuring that uneven downward force does not adversely affect performance of the spherical roller bearing supports 96 for the floating piston 94. As in the case of the compressor 28, one end of the vertical rod 98, e.g. the upper end, and the corresponding receiving aperture 99 defined at the top of the regulator tank (FIG. 9B) may both be square in cross-section, thereby to resist rotation of the floating piston 94 relative to the regulator tank 60.

A hydraulic dampening system 105 for restricting unwanted vertical oscillations of the floating piston 94 and maintaining the output of a continuous flow of compressed air at relatively constant pressure includes a double acting piston 107. The piston is coupled with the floating piston and responsive to the vertical velocity of the floating piston for controlling flow rate of hydraulic pressure fluid to each side of a double acting piston 107. This arrangement also facilitates output of a continuous flow of compressed air at relatively constant pressure.

Referring to FIGS. 9, 9A, and 9B, as in the case of the air compressor 28, effective and efficient sealing is maintained between the floating piston 94 and the opposed wall of the pressure regulator tank 60 by rolling flexible diaphragms 108, 110 that permit efficient, almost frictionless reciprocal movement of the piston 94 within the regulator tank 60, without loss of pressure. The sealed region 112 defined by the flexible diaphragms 108, 110 between the wall of the cylinder 60 and the opposed surface of the piston 94, maintained at −6 inches (−15.2 cm) W.C. by vacuum pump 70 acting through conduit 72, and thereafter acting through vacuum port 114, flow channel 115 in vacuum distributor 116, and vacuum distribution holes 117 (FIGS. 9 and 9B) in the wall of the regulator tank 60. This vacuum condition, e.g. of −6 inches W.C., is between the rolling diaphragms. Piston 94 provides +28 inches W.C. pressure on the air in conduits and space 56 of regulator plus connections to the air turbine and generator set 34. Operation under vacuum serves to resist collapse of the rolling diaphragm seals during movement of the piston, and also maintains seal shape, e.g. when system air pressure falls to atmospheric conditions, such as when the sea is calm. As described above, use of the flexible rolling diaphragms 108, 110 also eliminates the need for machined surfaces held to tight dimensional tolerances, as the surfaces and tolerances may only need to be those typically produced in the manufacture of above ground storage tanks of similar size.

The upper chamber 118 of the pressure regulator tank 60 is connected to the closed air system region 132 with the flexible bladder 124 of closed air reservoir 32 by conduit 119, or, as described above with reference to FIG. 1A, in another implementation, conduit 119 may be open to receive room air drawn from within the body of the floating buoy 12. This arrangement allows flow of air into and out of the chamber 118 to accommodate vertical movement of the floating piston 94 within the regulator tank 60 while maintaining ambient pressure in the upper chamber of the tank.

While output of compressed air from the compressor 28 goes to zero each time the compressor piston 40 reverses direction with motion of the waves, the pressure regulator 30 delivers a continuous flow of compressed air at constant pressure from the lower chamber 56 of the pressure regulator tank 60 to drive rotation of the air turbine 62 in the air turbine and generator set 34, to drive the generator 120 for generation of electricity to be delivered to a power grid on shore by suitable undersea cable (not shown). In a preferred implementation, the air turbine 62 may be equipped with an inflatable toroid throttle for speed control, and the coupled generator 120 may have variable load control, or electrical excitation from the grid connection.

Air pump 58, in communication with conduit 122, extracts spent air from the flexible bladder 124 or delivers ambient air to the bladder of the closed system air reservoir 32 to maintain the desired system pressure. The total volume of air in the enclosed system remains relatively constant; however, the total mass of air will typically vary depending on the operating pressure selected to drive the impulse turbine. It is expected that operating pressure will vary between +6 inches (+15.2 cm) W.C. and +28 inches (+71.0 cm) W.C. Where the system starts up and a pressure of +6 inches (+15.2 cm) W.C. is selected and controlled by the pressure regulator 30, outside air must be added to the system to make up for the volume of air compressed to the +6 inches (+15.2 cm) W.C. level. For every 100 cubic feet (2.83 cubic meters) of air at +6 inches (+15.2 cm) W.C., the air pump 58 must inflow 1.5 cubic feet ($4.2 \times 10^{-2}$ cubic meters) of air at atmospheric pressure to maintain atmospheric pressure on the discharge side of the impulse turbine 62. Each additional +4 inches (+10.2 cm) W.C. increase selected would require 1.0 cubic foot ($2.8 \times 10^{-2}$ cubic meters) of air pumped into the system. Conversely, the system must draw air out of the system to maintain internal pressure equal to atmospheric pressure when the barometric pressure falls. Rising barometric pressure will signal the need to pump in additional air to maintain the desired ±1 inch (2.5 cm) W.C. differential to atmospheric pressure. The flexible bladder 124 provides an inflatable reservoir for temporary storage of air volume for use in the closed air system. In this manner, a closed volume of air, e.g. air that has been treated, e.g. dried or lubricated, can be conserved and used through repeated cycles. In contrast, air in the ambient air region 130 of the air reservoir tank 126 external of the bladder 124, flowing in and out through the ambient air orifice and filter 128 in response to changes in volume of the closed air system region 132 of the flexible bladder 124, may be drawn from the atmosphere, e.g. from air within the body of the floating buoy 12, as described above with reference to FIG. 1A, and used without pretreatment.

Referring again to FIG. 1 et seq., a wave energy electrical power generation system 10 of the disclosure, as described above, may be mounted in a large floating buoy 12 anchored to the sea floor. A cylindrical wall 14 extends below the buoy to define a close-fitting chamber 16.

The floating buoy chamber 24 rests on the ocean surface, O, preferably with a displacement, X, e.g. of approximately 6 inches (15.2 cm), to provide force for compressing air in the compressor 28 to +28 inches (+71.1 cm) W.C. Motion of the ocean surface waves, W, causes the floating buoy 12 to rise and fall. The air compressor cylinder 36, mounted to the floating buoy within the chamber 26, also rises and falls with movement of the floating buoy in response to motion of the ocean waves, while the compressor piston 40 within the compressor cylinder chamber 38, and mounted to a central rod 45 connected to the neutral buoyancy piston 20, is maintained relatively vertically stationary.

The movement of the compressor cylinder chamber 38 relative to the compressor piston 40, i.e. reciprocal vertical movement of the compressor piston within the compressor chamber, alternately compresses the volumes of air contained within the upper chamber 38A and lower chamber 38B of the compressor cylinder, in turn. The volume of air within the chamber under compression is delivered via compressed air conduit 48, through check valve 50 or 51, into the lower chamber of the pressure regulator tank 60. Simultaneously, air from the closed air reservoir 132 within flexible bladder 124 and the continuous air flow discharged from the impulse air turbine 62 are delivered into the opposed chamber of the compressor cylinder via conduit 52 through check valve 53 or 54, or, in another implementation described above with reference to FIG. 1A, air reservoir within flexible bladder 124 and the continuous air flow discharged from the air turbine 62 may be delivered, as room air, directly into the open chamber defined body of the floating buoy 12. Flexible rolling diaphragms 64, 66 mounted between the compressor piston 40 and the wall of the compressor cylinder 36, defining a closed region 68 maintained at −6 inches (−15.2 cm) W.C., permit efficient, almost frictionless reciprocal movement of the piston within the cylinder, without loss of pressure. Maintaining the regions defined by the flexible diaphragms 64, 66 between the wall of the compressor cylinder or tank 36 and the opposed surface of the piston 40 under vacuum serves to resist collapse of the seal during a suction stroke, and also maintains seal shape, e.g. when system air pressure falls to atmospheric conditions, such as when the sea is calm. Use of the flexible rolling diaphragms also eliminates the need for machined surfaces held to tight dimensional tolerances. For example, the surfaces and tolerances may only need to be those typically produced in the manufacture of above ground storage tanks of similar size.

In the pressure regulator tank 60, compressed air from the compressor 28 is maintained under pressure in the lower chamber portion 56 by floating or roof piston 94, which is mounted within the regulator tank 60 by spherical roller bearing supports 96 on vertical rod 98. The level of pressure within the lower chamber portion 56 of the regulator tank 60 is controlled by regulation of the volume, i.e. weight, of water ballast, which is delivered to or removed from the variable volume water ballast tank 100 in piston 94 by operation of the water pump 102 through conduit 104 and hose 106, which is coiled to accommodate vertical movement of the floating piston 94. The floating piston 94 is baffled internally to resist sloshing of water within the ballast tank as the floating buoy rocks back and forth due to wave action. This arrangement assists in ensuring that uneven downward force does not adversely affect the spherical roller bearing supports 96 for the floating piston. As in the compressor, effective and efficient sealing is maintained between the floating piston 94 and the wall of the tank 60 by flexible rolling diaphragms 108, 110, with the region 112 between the flexible rolling diaphragms mounted between the floating piston 94 and the wall of the pressure regulator tank 60 maintained at −6 inches (−15.2 cm) W.C. by vacuum pump 70 acting through conduit 72, vacuum port 74, and vacuum distribution holes 76. This vacuum condition permits efficient, almost frictionless reciprocal movement of the piston within the tank, without loss of pressure, and without need for machined surfaces held to tight dimensional tolerances. The upper chamber portion 118 of the pressure regulator tank 60 is connected to the closed system air region 132 of the flexible bladder 124 by conduit 119, allowing flow of (treated) air into and out of the chamber to accommodate vertical movement of the floating piston 94 within the regulator tank 60 while maintaining ambient pressure in the upper chamber 118 of the regulator tank.

While output of compressed air from the compressor 28 goes to zero each time the compressor piston 40 reverses direction with motion of the waves, the pressure regulator 30 delivers a continuous flow of compressed air at constant pressure from the lower chamber 56 of the pressure regulator tank 60. The continuous flow of compressed are drives the air turbine 62 with an inflatable toroid throttle for speed control, coupled to a generator 120, with variable load control, for generating electricity to be delivered to the power grid on shore by suitable undersea cable (not shown).

Further implementations of the wave energy electrical power generation system of the disclosure will now be described. It will be understood by those of ordinary skill in the art that certain of the improvements and modifications described in this disclosure with respect to one or more of these implementations can also readily be implemented and/or adapted for use with similar advantage in other of the described implementations.

Figure 10:
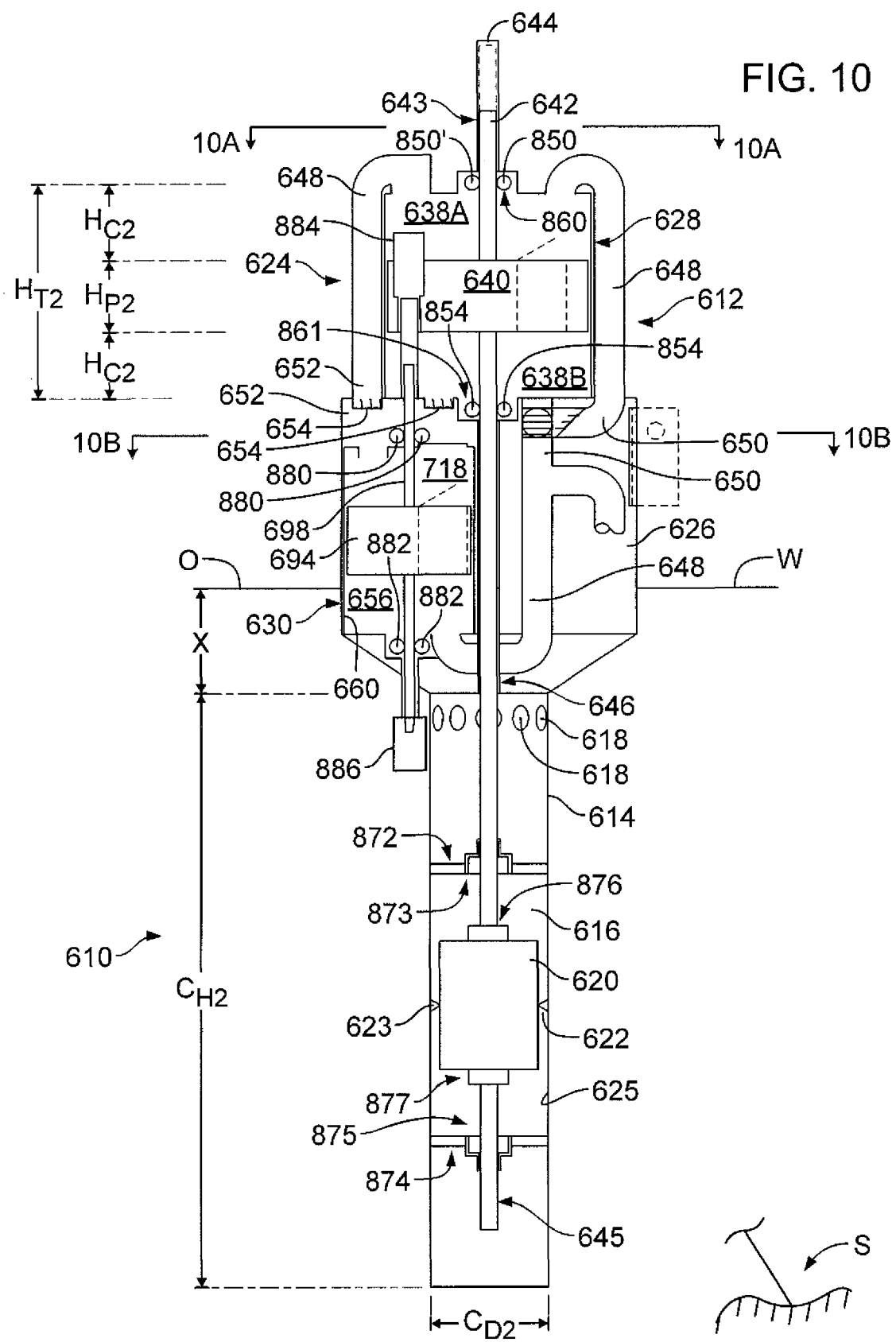

For example, referring now to FIG. 10 et seq., in another implementation, a wave energy electrical power generation system 610 of the disclosure has a large floating buoy 612, having a diameter, $D_2$, e.g. about fifteen feet (4.57 m), anchored to the sea floor, S. A cylindrical wall 614 extends below the buoy 612 to define a close-fitting chamber 616. The cylindrical wall has a diameter, $C_{D2}$, e.g. about 72 inches (1.83 m), and a height, $C_{H2}$, e.g. about 30 feet (9.14 m). The chamber wall defines a plurality of open water flow orifices 618, e.g. eight equally spaced orifices, each with a diameter of 15 inches (0.38 m) above a neutral buoyancy piston 620, which is positioned in a relatively vertically stationary position, in a neutral buoyancy tank 622 in the region of a narrow orifice ring 623 mounted on the inner cylinder wall 625.

An upper body portion 624 of the floating buoy 612 defines a closed chamber 626, within which are disposed the components of the system 610 for conversion of wave energy for generation of electricity, including an air compressor 628, a pressure regulator 630, and an air turbine and generator set 634.

Briefly, as described above, motion of the ocean surface waves, W, causes the floating buoy 612 to rise and fall, while the neutral buoyancy piston 620 remains relatively vertically stationary. The air compressor 628 has a closed tank or cylinder 636, having a diameter, e.g. 148 inches (3.76 m), and a wall thickness, e.g. 0.500 inch (12.7 mm), which is fixedly mounted to the floating buoy 612 within the chamber 626, and also rises and falls with movement of the floating buoy in response to motion of the ocean waves. The cylinder 636 defines a compressor chamber 638, within which is disposed a compressor piston 640. The compressor piston is mounted to a central square rod 642, which is connected at its lower end to the neutral buoyancy piston 620 that is maintained relatively vertically stationary (i.e., as opposed to the rising and falling wave motion of the floating buoy and the compressor cylinder).

Figure 10A:
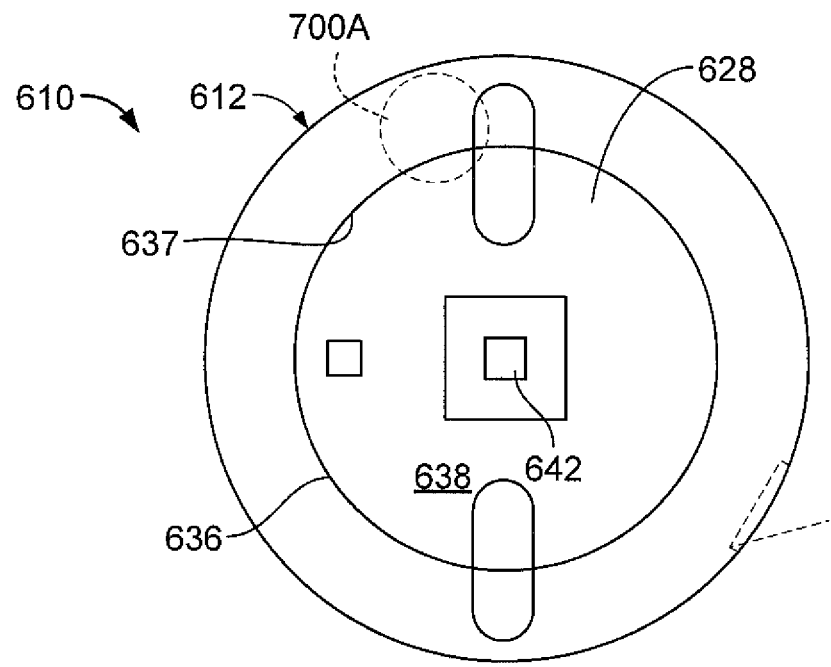
FIGS. 10A and 10B are somewhat diagrammatic top plan views of the wave energy electrical power generation system taken at the lines 10A-10A and 10B-10B, respectively, of FIG. 10.
Figure 10B:
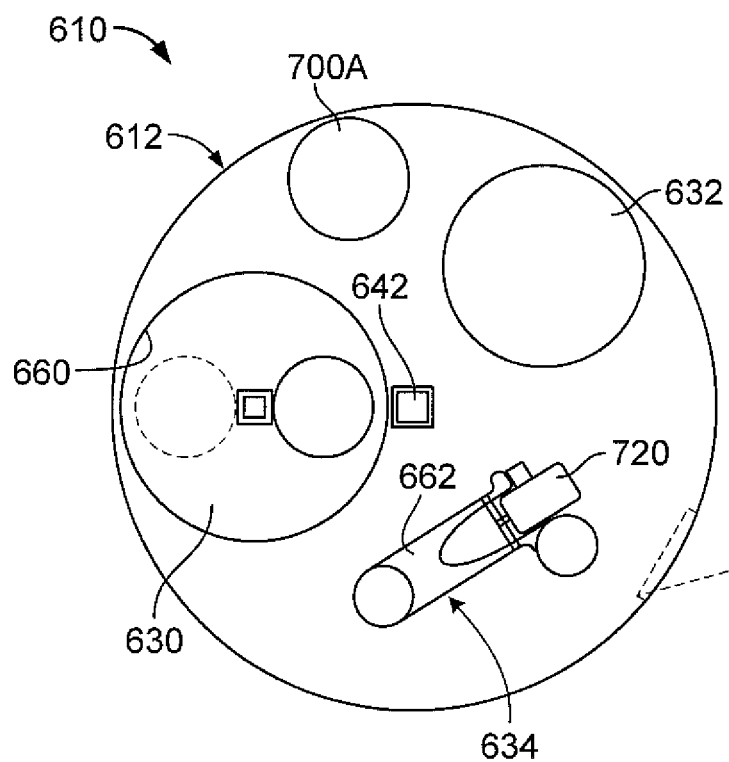
Figure 11:
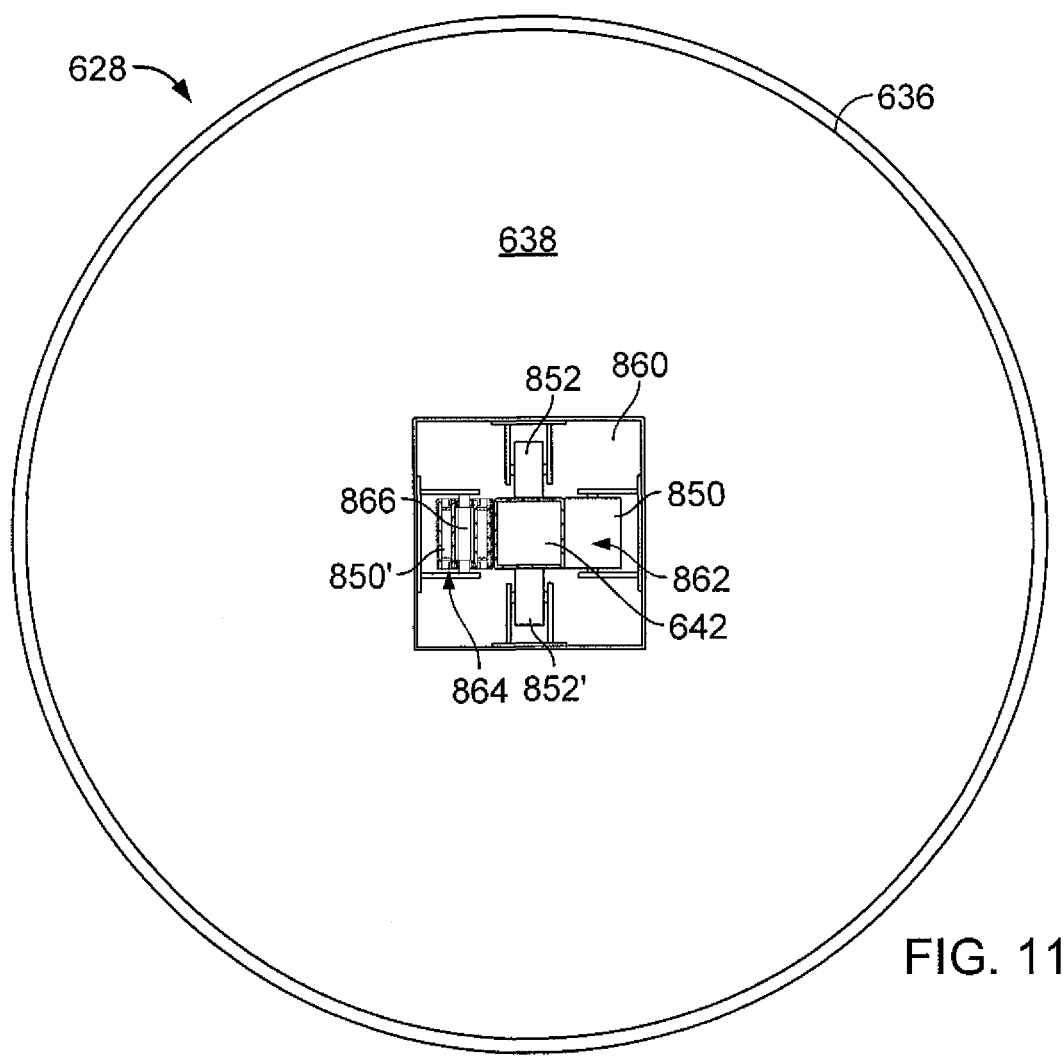
FIG. 11 is a top plan view and FIG. 11A is a side view of an opposed roller assembly guidance system for flat-sided, e.g. square or rectangular, vertical rods, e.g. for the compressor, pressure regulator, and neutral buoyancy pistons of the wave energy power generation system.
Figure 11A:
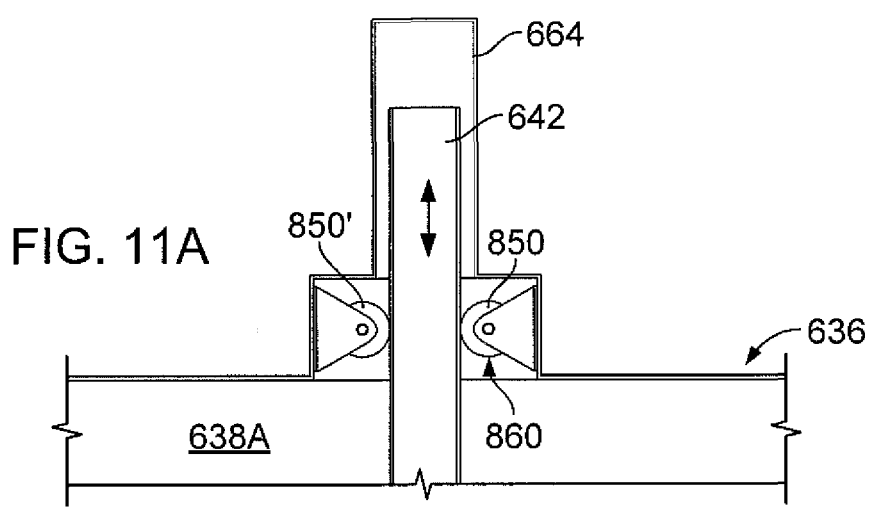

Referring also to FIGS. 10A and 10B, and also to FIGS. 11 and 11A, the central square rod 642, at its upper end 643, passes through two sets of opposed, upper rollers 850, 850' and 852, 852', respectively, mounted in a chamber 860 in communication with and recessed above the compression chamber 638, and disposed for engagement with opposite outer surfaces of the central, flat-side, e.g., square rod, while the upper end 643 of the central square rod is received within a closed tube or case 664 at the top of the cylinder 636, which extends 93 inches (2.36 meters) to provide clearance for the upper end of the rod at the upper end of its range of motion, and also to provide an air seal. In the present implementation, the first pair of opposed rollers 850, 850' are 8 inches (20.3 cm) in outer diameter and 8 inches (20.3 cm) in width, with a urethane cover 862, e.g. 0.5 inch (1.3 cm) thick. The rollers are mounted on spherical roller bearing blocks 864 on a 1.5 inch (3.8 cm) diameter shaft 866. The second pair of opposed rollers 852, 852', which serve primarily to provide guidance for the central square rod, are also 8 inches (20.3 cm) in outside diameter with a urethane cover 0.5 inch (3.8 cm) thick and mounted on spherical roller bearing blocks. The width of the second pair of opposed rollers may be selected to provide adequate guidance for the rod while also allowing clearance for engagement of the first pair of opposed rollers with opposite surfaces of the central square rod 642. The rod end 643 and case 644 are also preferably square in cross-section. The roller sets are designed and constructed for extended service with only minimal maintenance, and serve to resist rotation of the piston 640 relative to the cylinder 636. The lower end 645 of the central square rod 642 also extend through two sets of lower, opposed rollers (generally indicated at 854, 854') similarly mounted, i.e. in a chamber 861 recessed below the compression chamber, and disposed, respectively, for engagement with the opposite outer surfaces of the central square rod 642, which then passes through a case 646 extending to the bottom of the chamber 626. The upper end of the lower tube or case 646 extends between air-tight and water-tight connections at the upper end (to the lower surface of the compressor chamber) and at the lower end (to the inner surface of the floating buoy), thereby to resist leakage of water into the floating buoy chamber 626, while water pressure in the cylinder 614 pressing into the end of the case 646 surrounding the central square rod 642 provides air-tight sealing for the chamber of the compressor 604.

In one implementation, the compressor piston 640 has a vertical height, $H_{P2}$, e.g. 43.4 inches (1.10 m), with vertical clearance, $H_2$, e.g. 40.3 inches (1.02 m), from each of the top and bottom ends of the compressor cylinder 636 when the system is at rest, e.g. in calm conditions, and the compressor chamber has a height, $H_{T2}$, e.g. 10 feet, 4 inches (3.15 m). All dimensions, here and throughout this disclosure, are provided only by way of example.

The lower end 645 of the central square rod extends through upper and lower snubber cylinders 872, 874 mounted to the inner surface of the close fitting cylinder 614, above and below the neutral buoyancy piston 620. Each snubber cylinder 872, 874 defines a cavity 873, 875, respectively, facing opposed ends of the neutral buoyancy piston 620, and the neutral buoyancy piston defines upper and lower axial snubber pistons 876, 877, respectively, extending from its top and bottom end surfaces. Each snubber piston 876, 877 is sized and shaped for corresponding, e.g. close-fitting, engagement with the opposed snubber cavity 873, 875, e.g. as the large floating buoy 612 containing the compression chamber 638 and including the down-pending cylindrical chamber 614 rises and falls with wave action, causing the incompressible hydraulic action of the fluid (seawater) trapped within the snubber cavity 873, 875 by the approaching snubber piston 876, 877 to act as a hydraulic shock absorber, thereby cushioning and braking the relative movement of the snubber cylinder 872, 874 (with attached buoy and compression chamber) relative to the snubber piston 876, 877 (with attached central square rod 642 and neutral buoyancy piston 620), thereby to minimize potentially damaging engagement of the moving elements at opposite ends of the range of motion therebetween.

In one implementation, the neutral buoyancy piston 620 has a diameter of 60 inches (1.52 m) and a height of 79 inches (2.01 m). The overall height of the surrounding cylinder 614 is 30 feet (9.14 m), providing clearance above and below the piston at rest, i.e. during a flat calm, of 134 inches (3.40 m). Displacement of the system 610, i.e., X, is 36 inches (0.91 m).

As discussed above, movement of the compressor piston 640 relative to the compressor cylinder chamber 638, i.e. reciprocal vertical movement of the compressor piston within the compressor chamber, alternately compresses the volumes of air contained within the upper chamber portion 638A and the lower chamber portion 638B of the chamber 638 of the compressor cylinder 636, in turn. The volume of air within the chamber portion under compression is delivered via compressed air conduit 648, through check valve 650 (e.g., see FIG. 4, et seq., described above) into the lower chamber 656 of the pressure regulator tank 660 (or directly to air turbine and generator set 634). Simultaneously, air the air reservoir 632 and/or spent air pumped by air pump (e.g., air pump 58, as seen in FIG. 1) from the air turbine 662 of the air turbine and generator set 634 is delivered into the opposed chamber portion of the compressor cylinder 636 via air inlet conduit 652 through check valve 654.

Referring also to FIG. 9, et seq., upper and lower flexible rolling diaphragms, e.g. 0.030 inch (0.76 mm) thick urethane, are mounted to extend between the compressor piston 640 and the wall 637 of the compressor cylinder 636 (e.g. as described above with reference to FIGS. 5 and 5A). The rolling flexible diaphragms thus permit efficient, almost frictionless reciprocal movement of the piston 640 within the cylinder 636, without loss of pressure. The sealed region defined by the flexible diaphragms between the wall 637 of the cylinder 636 and the opposed surface of the piston 640, e.g. maintained at −6 inches (−15.2 cm) W.C. by a vacuum pump acting through conduit, and thereafter acting through vacuum port 674 (FIG. 7) and vacuum distribution holes extending over flow channel (e.g., vacuum distribution holes 76 extending over flow channel 77, as seen in FIG. 3) in the wall 637 of the compressor cylinder 636, serves to resist collapse of the rolling diaphragm seal during a suction stroke. It also maintains seal shape, e.g. when system air pressure falls to atmospheric conditions when the sea is calm. Use of the flexible rolling diaphragms also eliminates the need for machined surfaces held to tight dimensional tolerances. For example, the surfaces and tolerances of compressor 628 (and pressure regulator 630) may only need to be those typically produced in the manufacture of above ground storage tanks of similar size, and vacuum space clearance, C (FIG. 5), e.g. two inches (5.1 cm), may be maintained between the opposed surfaces of the compressor cylinder 636 and the piston 640.

Referring still to FIG. 10, et seq., in the lower chamber 656 of the pressure regulator tank 660, compressed air from the compressor 628 is maintained under pressure by floating or roof piston 694, which is mounted within the regulator tank 660 on vertical rod 698. The piston 694 is fixedly mounted to the rod, thus to resist leakage of compressed air from the lower chamber through any aperture between the piston 694 and the rod 698. The vertical square rod 698 is guided within the regulator tank 360 by upper and lower sets of opposed rollers 880, 882, respectively, similar to those discussed above with reference to the central square rod 642, mounted in chambers in communication with and extending above and below the pressure regulator tank 660. The upper and lower ends of the vertical square rod 698 extend into upper and lower closed cases 884, 886, respectively, dimensioned to avoid potentially damaging contact of the vertical square rod, e.g. at upper and lower extremes of travel. The upper and lower sets of opposed rollers 880, 882 are also constructed to dampen travel of the regulator cylinder in a manner to minimize potentially damaging contact of the cylinder with surface of the tank 660. Upper and lower cases 884, 886 may also be equipped with dampening arrangements, e.g. for the purpose of reducing and/or minimizing damaging engagement of moving elements during heavy weather. For example, hydraulic snubbing arrangements, as described above with respect to the neutral buoyancy and compressor pistons, although sealing against penetration of hydraulic fluids into the chamber space would be a concern. In an alternative implementation, a Belleville spring washer stack may be employed in a braking plate arrangement, and/or may be used as a safety hold e.g. mounted to be held in retracted state under power and to engage upon release or loss of power.

The level of pressure within the lower chamber of the regulator tank is controlled by regulation of the volume, i.e. weight, of water in the variable volume water ballast tank 700, which is delivered to, or removed from, the piston 694 by a water pump, through a water conduit and hose (which is shown coiled to accommodate vertical movement of the floating piston 664), facilitating output of a continuous flow of compressed air at relatively constant pressure.

The floating piston is baffled internally (not shown) to resist sloshing of water within the ballast tank 700 and the floating piston 694 as the floating buoy 612 rocks back and forth due to wave action. This arrangement assists in ensuring that uneven downward force does not adversely affect performance of the spherical roller bearing supports 880, 882 for the floating piston 694. A hydraulic dampening system 705 for restricting unwanted vertical oscillations of the floating piston 694 and maintaining the output of a continuous flow of compressed air at relatively constant pressure includes a double acting piston 886 (FIG. 10). The piston is coupled with the floating piston and responsive to the vertical velocity of the floating piston for controlling flow rate of hydraulic pressure fluid to each side of a double acting piston 886 (FIG. 10). This arrangement also facilitates output of a continuous flow of compressed air at relatively constant pressure.

In one implementation, the pressure regulator piston 694 has a height of 41.4 inches (1.05 m) with vertical clearance of 36.3 inches (0.92 m), from each of the top and bottom ends of the regulator 630 when the system is at rest, e.g. in calm conditions, and the regulator chamber has a height of 114 inches (2.90 m).

Referring to FIGS. 9, 9A, and 9B, as in the case of the air compressor 628, effective and efficient sealing is maintained between the floating piston 694 and the opposed wall of the pressure regulator tank 660 by rolling flexible diaphragms that permit efficient, almost frictionless reciprocal movement of the piston 694 within the regulator tank 660, without loss of pressure. The sealed region defined by the flexible diaphragms between the wall of the cylinder and the opposed surface of the piston, maintained, e.g., at −6 inches (−15.2 cm) W.C. by the vacuum pump acting through the conduit, and thereafter acting through vacuum port, vacuum flow channel, and vacuum distribution holes in the wall of the regulator tank. This −6 inches W.C. vacuum is between the rolling diaphragms. The piston provides, e.g., +28 inches W.C. pressure on the air in conduits and within the pressure regulator, plus connections to the turbine. Operation under vacuum serves to resist collapse of the rolling diaphragm seals during movement of the piston, and also maintains seal shape, e.g. when system air pressure falls to atmospheric conditions, such as when the sea is calm. As described above, use of the flexible rolling diaphragms also eliminates the need for machined surfaces held to tight dimensional tolerances, as the surfaces and tolerances may only need to be those typically produced in the manufacture of above ground storage tanks of similar size.

In contrast to implementations of the disclosure described above, the upper chamber 718 of the pressure regulator tank 660 and the bladder region of the bladder tank 632 are open to the space 626 internal to the float chamber 612.

While output of compressed air from the compressor 628 goes to zero each time the compressor piston 640 reverses direction with motion of the waves, the pressure regulator 630 delivers a continuous flow of compressed air at constant pressure from the lower chamber 656 of the pressure regulator tank 660 to drive rotation of the air turbine 662 in the air turbine and generator set 634, to drive the generator 720 for generation of electricity to be delivered to a power grid on shore by suitable undersea cable (not shown). In a preferred implementation, the air turbine 362 may be equipped with an inflatable toroid throttle for speed control, and the coupled generator 720 may have variable load control, or electrical excitation from the grid connection.

Referring again to FIG. 10 et seq., a wave energy electrical power generation system 610 of the disclosure, as described above, may be mounted in a large floating buoy 612 anchored to the sea floor. A cylindrical wall 614 extends below the buoy to define a close-fitting chamber 616.

The floating buoy chamber 624 rests on the ocean surface, O, preferably with a displacement, X, e.g. of approximately 36 inches. Motion of the ocean surface waves, W, causes the floating buoy 612 to rise and fall. The air compressor cylinder 636, mounted to the floating buoy within the chamber 626, also rises and falls with movement of the floating buoy in response to motion of the ocean waves, while the compressor piston 640 within the compressor cylinder chamber 638, and mounted to a central rod 642 connected to the neutral buoyancy piston 620, is maintained relatively vertically stationary.

The movement of the compressor cylinder chamber 638 relative to the compressor piston 640, i.e. reciprocal vertical movement of the compressor piston within the compressor chamber, alternately compresses the volumes of air contained within the upper chamber 638A and lower chamber 638B of the compressor cylinder, in turn. The volume of air within the chamber under compression is delivered via compressed air conduit 648, through check valve 650, into the lower chamber of the pressure regulator tank 660. Simultaneously, air from the bladder tank 632 and the continuous air flow discharged from the air turbine 662 are delivered into the opposed chamber of the compressor cylinder via conduit 652 through check valve 654. Flexible rolling diaphragms (not shown) mounted between the compressor piston 640 and the compressor cylinder wall 637, defining a closed region (e.g. region 68, as seen in FIG. 2) maintained, e.g., at −6 inches (−15.2 cm) W.C., permit efficient, almost frictionless reciprocal movement of the piston within the cylinder, without loss of pressure. Maintaining the regions defined by the flexible diaphragms between the wall of the compressor cylinder or tank 636 and the opposed surface of the piston 640 under vacuum serves to resist collapse of the seal during a suction stroke, and also maintains seal shape, e.g. when system air pressure falls to atmospheric conditions, such as when the sea is calm. Use of the flexible rolling diaphragms also eliminates the need for machined surfaces held to tight dimensional tolerances. For example, the surfaces and tolerances may only need to be those typically produced in the manufacture of above ground storage tanks of similar size.

In the pressure regulator tank 660, compressed air from the compressor 628 is maintained under pressure in the lower chamber portion 656 by floating or roof piston 694, which is mounted within the regulator tank 660 by spherical roller bearing supports (not shown) on vertical rod 698. The level of pressure within the lower chamber portion 656 of the regulator tank 660 is controlled by regulation of the volume, i.e. weight, of water ballast, which is delivered to or removed from the variable volume water ballast tank in piston 694 by operation of a water pump through a conduit and hose (e.g. as described above with reference to FIGS. 1, 9, and 9A) from water storage tank 700A (FIG. 10B). The floating piston 694 is baffled internally to resist sloshing of water within the ballast tank as the floating buoy rocks back and forth due to wave action. This arrangement assists in ensuring that uneven downward force does not adversely affect the spherical roller bearing supports for the floating piston. As in the compressor, effective and efficient sealing is maintained between the floating piston 694 and the wall of the tank 660 by flexible rolling diaphragms with the region between the flexible rolling diaphragms mounted between the floating piston and the wall of the pressure regulator tank maintained, e.g., at −6 inches (−15.2 cm) W.C. by vacuum pump acting through a conduit, vacuum port, flow conduit, and vacuum distribution holes. This vacuum condition permits efficient, almost frictionless reciprocal movement of the piston within the tank, without loss of pressure, and without need for machined surfaces held to tight dimensional tolerances. The upper chamber portion of the pressure regulator tank 660 is open to the floating buoy chamber 626.

While output of compressed air from the compressor 628 goes to zero each time the compressor piston 640 reverses its direction with motion of the waves, the pressure regulator 630 delivers a continuous flow of compressed air at constant pressure from the lower chamber 656 of the pressure regulator tank 660. The continuous flow of compressed air drives the air turbine 662 with an inflatable toroid throttle for speed control, coupled to a generator 720, with variable load control, for generating electricity to be delivered to the power grid on shore by suitable undersea cable (not shown).

Figure 12:
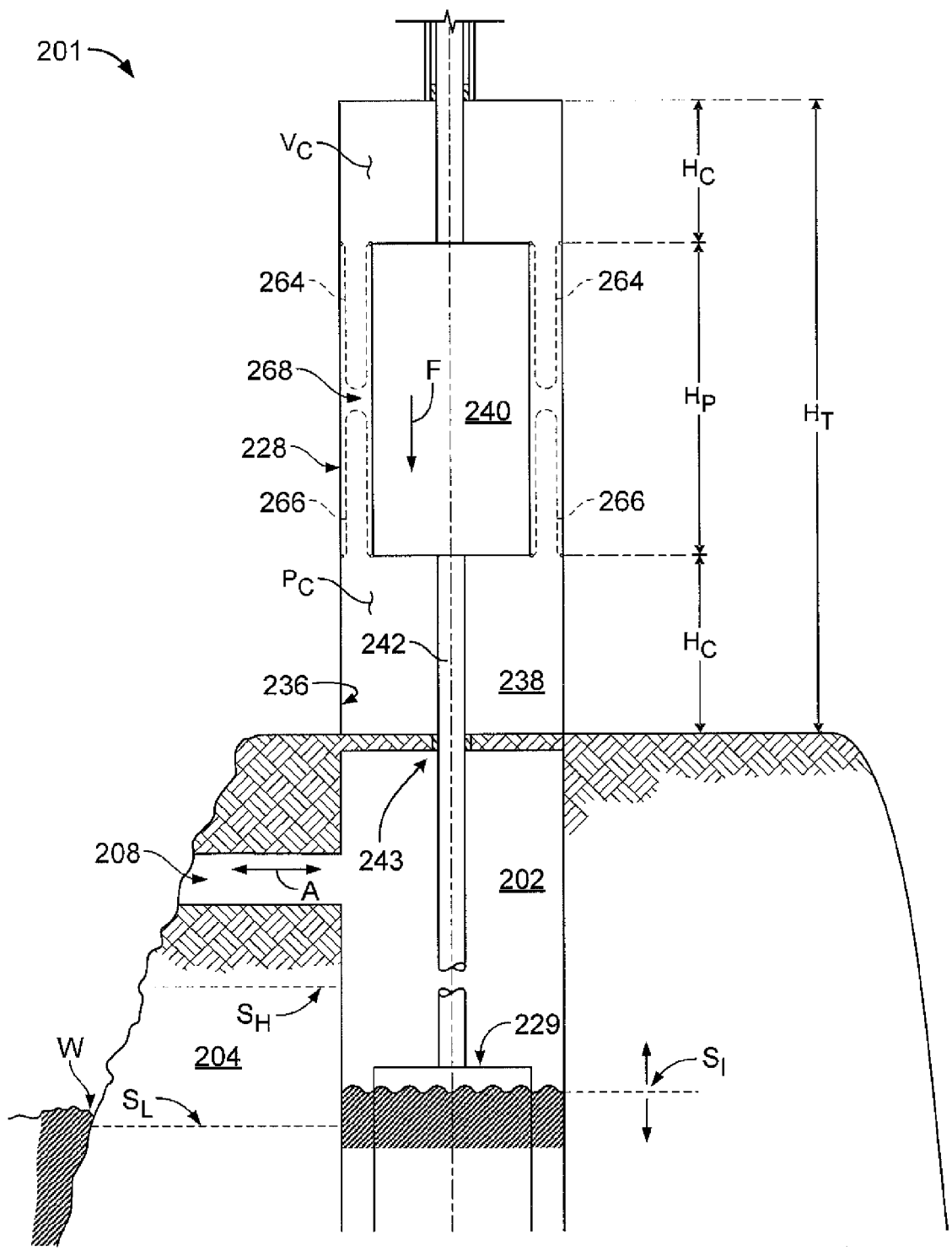
FIG. 12 is a somewhat diagrammatic side section representation of a shoreline installation of another wave energy electrical power generation system of the disclosure.
Figure 13:
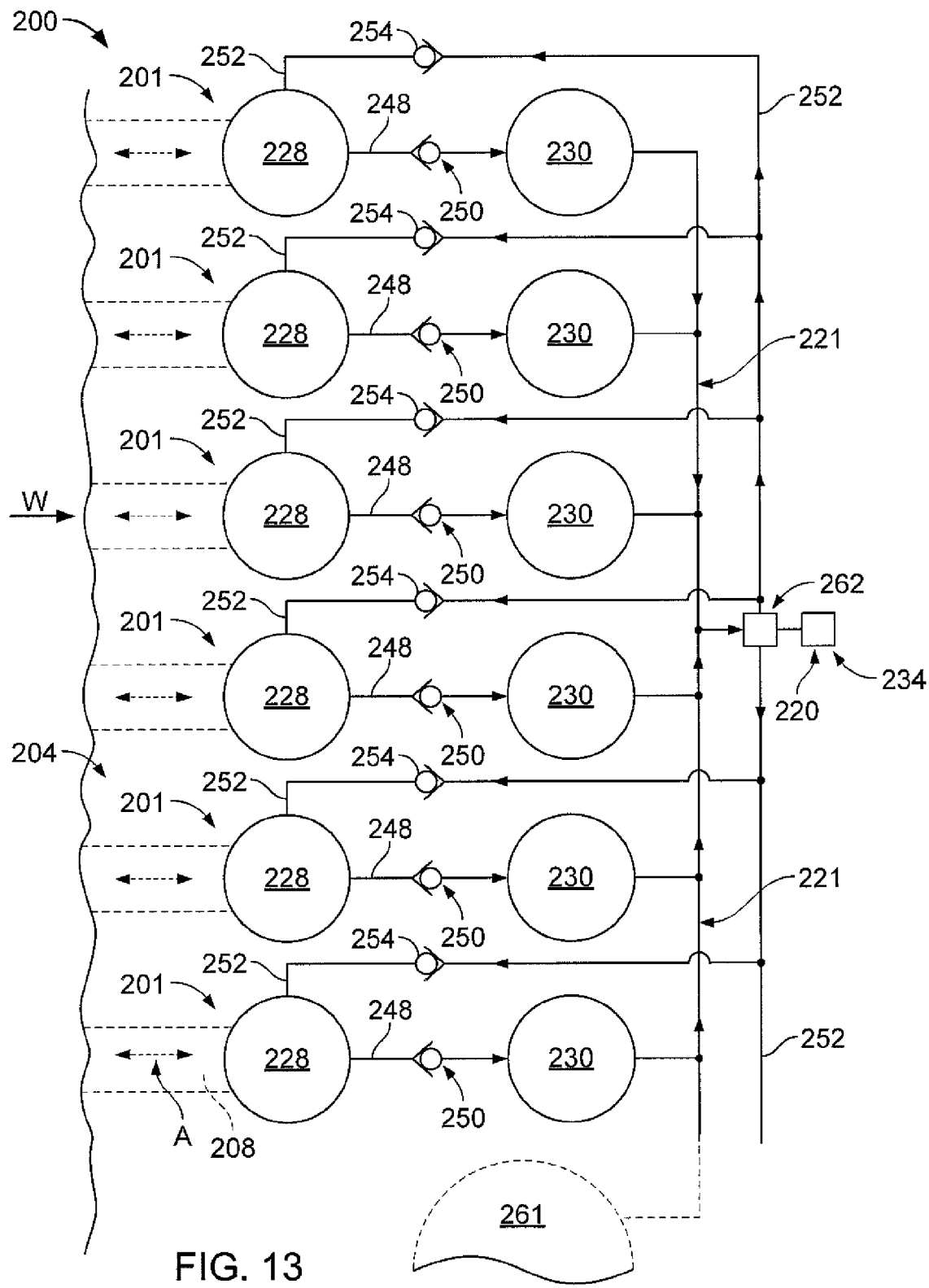
FIG. 13 is a somewhat diagrammatic top plan representation of an expandable arrangement of multiple elements of the shoreline installation of the wave energy electrical power generation system of FIG. 12.

In another implementation, a wave energy electrical power generation system of the disclosure has the form of a closed shoreline installation, as shown in FIGS. 12 and 13, which will now be described.

In particular, an air compressor 228 of shoreline installation 200 is positioned above a vertical cylinder 202 cut into the shore 204, e.g. a granite shore. A first or lower horizontal connecting passageway 206 (seen more clearly in FIG. 15) is cut into the shore at a level below the sea surface at low tide, $S_L$, and a second or upper horizontal connection passageway 208 cut into the shore at a level above the sea surface at high tide, $S_H$. The lower passageway 206 permits sea water, SW, to enter and exit the vertical cylinder 202, raising and lowering the level of water in the vertical cylinder, $S_I$, in response to action of the waves, W, against the shore. The upper passageway 208 allows the free movement of air, A, into and out of the cylinder 202 as the internal seawater surface moves vertically up and down.

The air compressor 228, positioned generally above the vertical cylinder 202, includes a fixed compressor tank structure 236 mounted on the shore and defining a compression chamber 238. A compressor piston 240 is disposed within the chamber 238 and mounted on a central rod 242, which passes through air and water seal 243 to connection to a flotation body 229 in the vertical cylinder 202. The flotation body 229 imparts a force on the compressor piston 240 by increasing the depth of water displaced with a rising wave seawater level within the vertical cylinder 202. That force is reversed to pull down on the compressor piston 240 by decreasing the depth of water displaced with a falling wave seawater level within the vertical cylinder 202.

As described above (e.g. with reference to FIG. 2), the compressor 228 uses rolling flexible diaphragm seals 264, 266 between the vertically-moving compressor piston 240 and the fixed compressor tank 228 to accommodate tidal effects on the position of the flotation body 229. As above, the sealed region 268 defined between the flexible diaphragms 264, 266 is preferably maintained at −6 inches (−15.2 cm) W.C. to control the rolling diaphragms during up and down compression strokes of the piston 240 within chamber 238.

Again as described above, and with particular reference to FIGS. 1 and 2, during operation of the closed shoreline installation 201 of the wave energy electrical power generation system of the disclosure, clean dry air (e.g. from an external source, $A_C$ (FIGS. 15 and 16)), is delivered in turn, via a closed conduit and check valve system 252, 254 (FIG. 13), into each of the upper and lower portions of chamber 238 during the intake stroke. The clean dry air is then compressed during the compression stroke, and delivered, via closed conduit and check valve system 248, 250 (FIG. 13), into the constant pressure regulator tank 230 (FIG. 13). Each stroke of the compressor piston 240 creates compression or pressure, $P_C$, e.g. of about +24 inches (+61.0 cm) W.C., in the compression chamber portion under compression stroke (by way of example only, the piston 240 is shown in a downward compression stroke, as indicated by arrow, F), and creates suction or vacuum, $V_C$, e.g. of about −3 inches (−7.6 cm) W.C, in the compression chamber portion under suction stroke. In one implementation of the system described, the piston 240 moves over a vertical distance equal to about six percent (6%) of the air column height to develop +28 inches (+71.1 cm) W.C. of pressure (where 1 atmosphere equals about +406.8 inches (+1033.2 cm) W.C.).

Referring again to FIG. 12, the tank 236 of compressor 228 must be sized to provide piston 240 with sufficient clearance height, both above and below the piston, to allow for up and down vertical movement of the piston 240 relative to the cylinder 236. For implementations of the system 201 where the flotation body 229 is constructed with a fixed amount of buoyancy, the piston 240 has height, $H_P$, equal to the sum of the difference between high tide and low tide plus the maximum anticipated wave height, while the additional clearance height, $H_C$, both above and below the piston is equal to the sum of one-half of the difference between high tide and low tide plus one-half of the maximum wave height. The overall height of the compression chamber, $H_T$, is thus the sum of twice the difference between high tide and low tide plus twice the maximum wave height.

Referring also to FIG. 13, a system 200 consisting of a large number of wave energy electrical power generation systems 201 can be installed along the shore 204, each over a vertical cut cylinder 202 (FIG. 12) connected to a lower horizontal tube 206 (FIG. 15) for inflow and exit of seawater and to an upper horizontal tube 208 (FIG. 12) for intake and exhaust of air, A. Each system 201 has a float-driven compressor 228, lifted and lowered with action of ocean waves, W, to provide compressed air to drive a large turbine 262, via multiple constant pressure regulator tanks 230, or via a suitable single, very large pressure regulator/storage tank (261, suggested in dashed line), to drive generator 220. A closed air system includes conduits 248 (with check valves 250 or 500 (see, e.g. FIGS. 4, 4A, and 4B)) connecting the compressors 228 to the pressure regulators 230, conduit system 221 connecting the regulators to the air turbine/generator set 234, and conduits 252 (with check valves 254) connecting the air turbine 262 to the float driven compressors 228 for return of clean, dry air.

Figure 14:
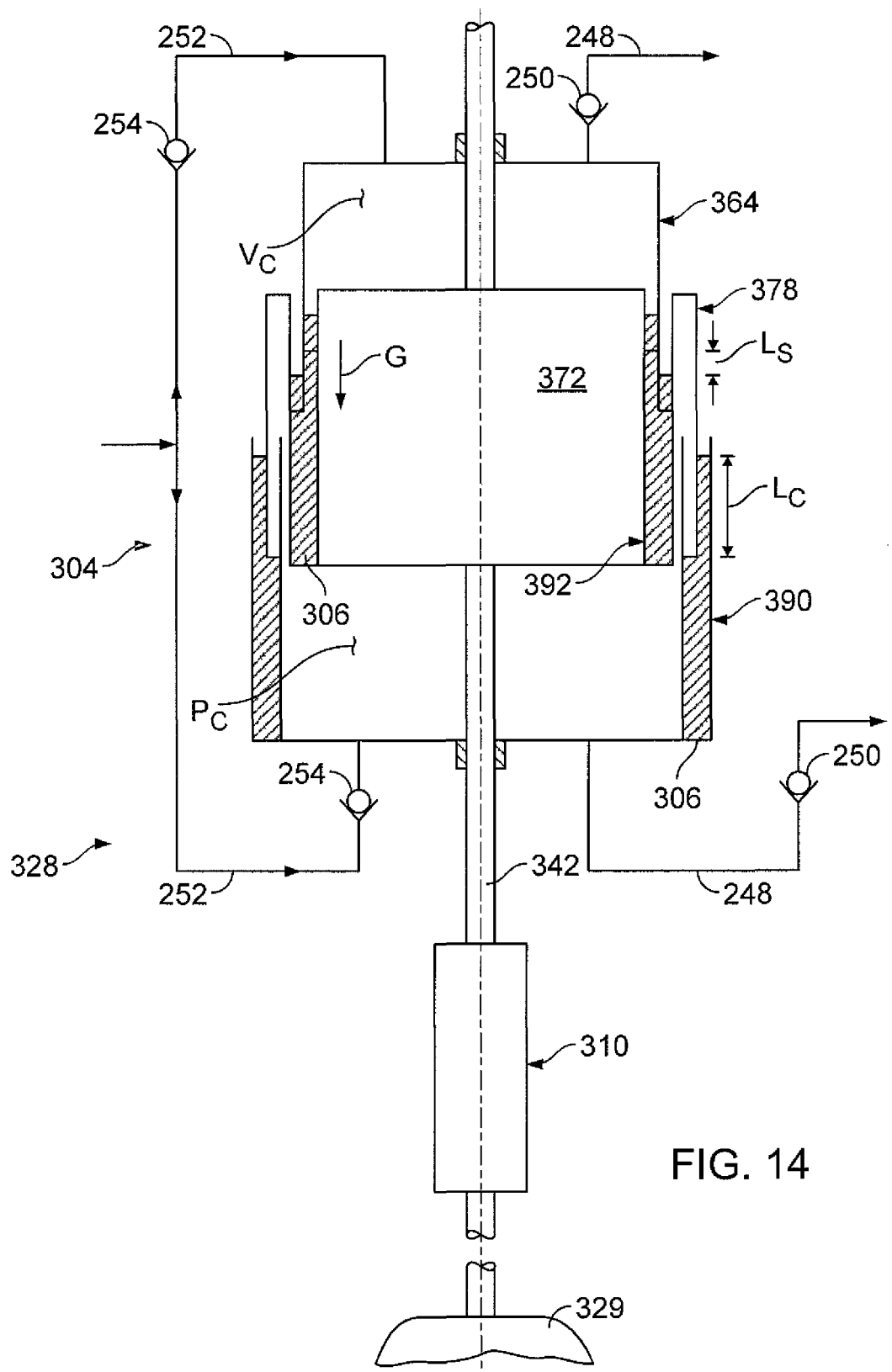
FIG. 14 is a somewhat diagrammatic side plan view of an air compressor for another implementation of a shoreline installation of the wave energy electrical power generation system of FIG. 12, equipped with an alternative liquid sealing arrangement and a tide adjusting mechanism.
Figure 14A:
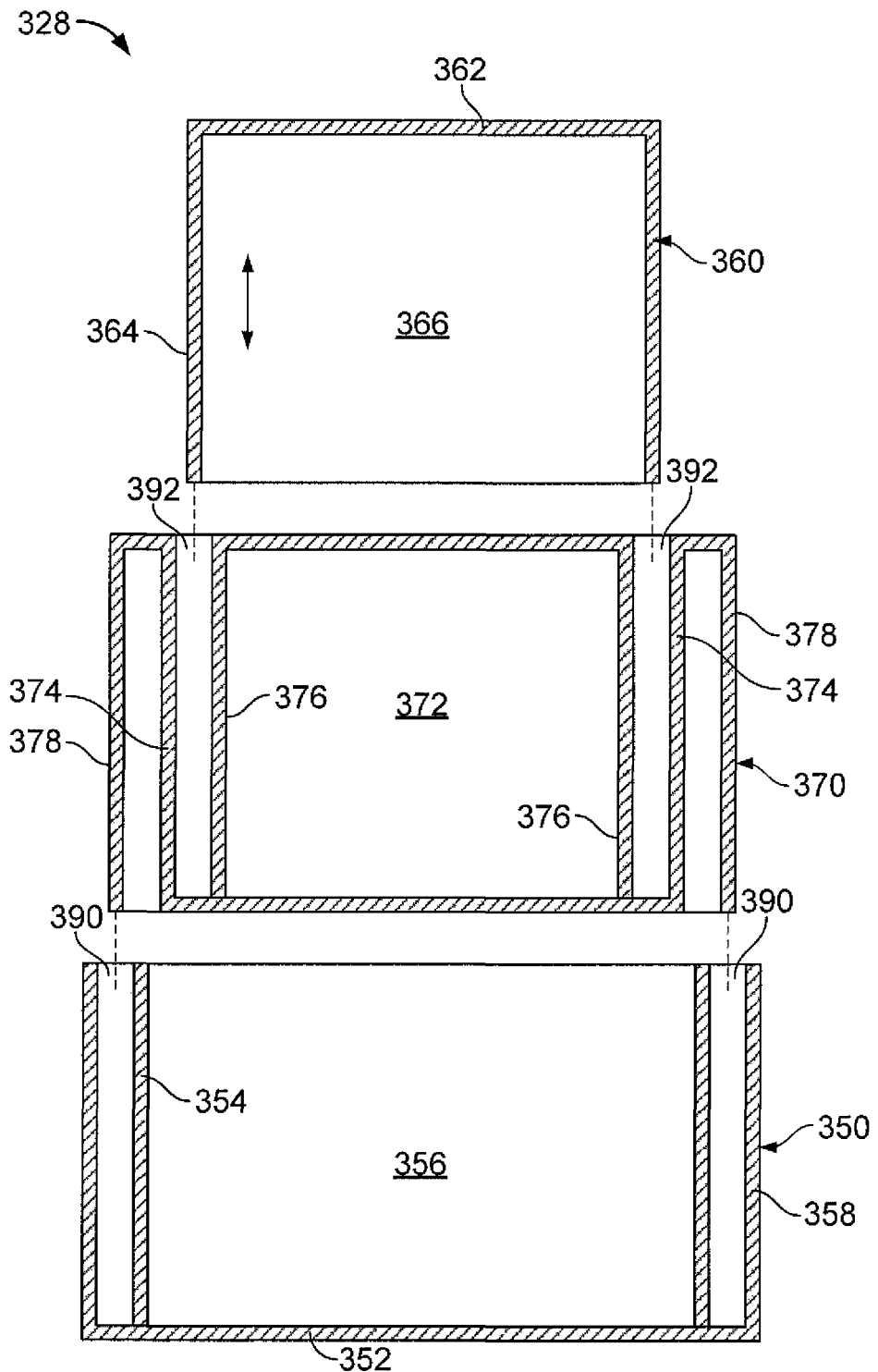
FIG. 14A is an exploded view of the air compressor of FIG. 14, and FIGS. 14B and 14C, FIGS. 14D and 14E, and FIGS. 14F and 14G are top and bottom plan views, respectively, of the compressor top chamber element, the compressor intermediate piston element, and the compressor base chamber element of the air compressor of FIG. 14.

Referring to FIGS. 14 and 14A, in another closed shoreline installation of the wave energy electrical power generation system of the disclosure, liquid trough sealing arrangement 304, e.g. for use in place of the rolling diaphragms described above (in FIG. 12), is shown. In this implementation, an air compressor 328 consists of a base portion 350, a top portion 360, and an intermediate piston portion 370. The base portion 350 consists of a circular, open-ended base cylindrical element 352 with an upstanding cylindrical inner wall 354, defining a lower compression chamber portion 356, and an upstanding cylindrical outer wall 358, with the inner cylindrical wall 354, defining a circular liquid seal trough 390. The top portion 360 consists of an inverted, circular, open-ended base cylindrical element 362 with down-pending cylindrical wall 364, defining an upper compression chamber portion 366. The intermediate piston portion 370 consists of a circular, closed central cylindrical element defining a piston body 372, an upstanding cylindrical wall 374, with the opposed wall 376 of the piston body, defining a liquid seal trough 392, and an outer down-pending cylindrical outer wall 378.

Referring also to FIGS. 14B through 14F, the base portion 350 and the intermediate piston portion 370 are mutually sized and constructed to allow the down-pending cylindrical wall 378 of piston portion 370 to be received into the liquid trough 390 defined by the base portion 350, in sealing engagement with the sealant liquid 306 contained therein, and the piston body 372 proceeds in a downward compression stroke to compress the air in compression chamber portion 356. The top portion 360 and the intermediate piston portion 370 are also mutually sized and constructed to allow the down-pending cylindrical wall 364 of top portion 360 to be received into the liquid trough 392 defined by the piston portion 374, in sealing engagement with the sealant liquid 306 contained therein, and the piston body 372 proceeds in an upward compression stroke to compress the air in compression chamber portion 366. As described above, relative reciprocal vertical movement among the base portion 350, the top portion 360, and/or the piston portion 370 (e.g., the base and top portions may be relatively fixed, with the piston portion moving relative thereto, or the piston may be fixed, with the top and base portions moving relative thereto, or other combinations of relative movement may be implemented).

As described above with reference to FIGS. 1 and 2, during a compression stroke in the upper or lower compression chamber, compressed air is passed through an intervening conduit 248 and check valve 250 into a pressure regulator tank, while air is drawn into the opposed lower or upper compression chamber under suction through conduit 252 and check valve 254. This arrangement utilizes the seal 304 provided by sealant liquid 306 in a pair of circular, liquid troughs 390, 392 into which circular, open-ended cylindrical walls 364, 378 are centrally positioned to provide a dam that separates ambient pressure from positive or negative pressure produced by relative vertical movement of the compressor piston element 372.

The vertical distance between the liquid sealed compressor 328 and the driving flotation body 329 is adjustable, e.g. by means of a tidal compensation adjusting mechanism 310, so that tidal sea level changes do not radically affect the depth required by the circular liquid troughs 390, 392 beyond the full vertical stroke of the compressor piston 372. For example, each stroke of the compressor piston 372 creates compression or pressure, $P_C$, e.g. of about +28 inches (+71.0 cm) W.C. in the compression chamber portion under compression stroke (by way of example only, the piston 372 is also shown in a downward compression stroke, as indicated by arrow, G), and creates suction or vacuum, $V_C$, e.g. of about −3 inches (−7.6 cm) W.C, in the compression chamber portion under suction stroke. As a result, a minimum liquid seal height, $L_S$, e.g. of 3 inches (7.6 cm), is required on the suction stroke and a minimum liquid seal height, $L_C$, e.g. of 28 inches (70.1 cm), is required on the compression stroke. (These minimum liquid seal heights apply to water-based and other sealant liquids having specific gravity of approximately 1.0 and can be adjusted for sealant liquids of other specific gravity. For example, mercury (mentioned below as a possible alternative sealant liquid) has a specific gravity of 13.6, requiring an adjusted minimum liquid seal height, $L_S$, of about 0.2 inch (5.1 mm) on the suction stroke and an adjusted minimum liquid seal height, $L_C$, of about 1.5 inches (3.8 cm) (on the compression stroke.)

The sealant liquid 306 is selected to have relatively low vapor pressure and high specific density, plus an anti-freeze feature, e.g. all as compared to fresh or seawater, in order to reduce differential liquid height necessary to accomplish sealing. An example of a suitable alternative sealant liquid is mercury, but other suitable sealant liquids may also be employed.

A number of implementations of this disclosure have been described above. Nevertheless, it will be understood that various modifications may be made without departing from the spirit and scope of the disclosure.

For example, in the closed flotation body system represented in the implementation of FIG. 12, the compressor tank 236 must have large vertical dimensions in order to accommodate considerable changes in both tidal height (e.g., between high and low tides) and in wave height (e.g. between wave crest and wave trough). This issue may be addressed by a tide adjusting mechanism 310, e.g., as shown in FIG. 14, or as described below with reference to FIG. 16.

Figure 15:
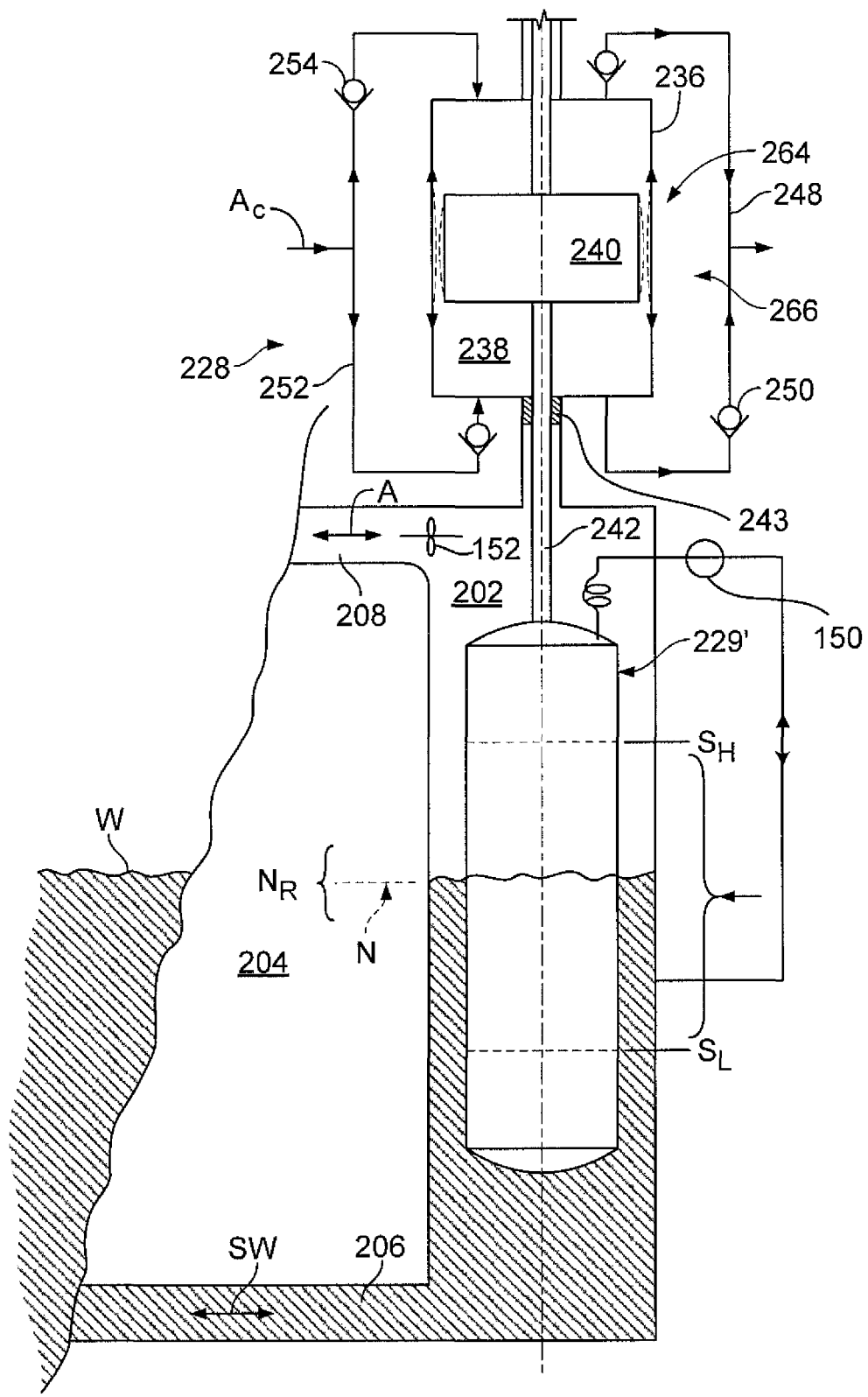
FIG. 15 is a somewhat diagrammatic side plan view of an air compressor for yet another implementation of a shoreline installation of the wave energy electrical power generation system of FIG. 12, equipped with an alternative tide adjusting mechanism in the form of a float tank.

Referring also to FIG. 15, in an alternative implementation, water ballast may be added to and removed from the flotation body 229' (e.g., by water pump 150) in order to establish a neutral flotation level, N, (or flotation range, $N_R$, e.g., plus or minus 12 inches (30.5 cm) for the flotation body, thus adjusting for tidal shift in base or mean water level. In this fashion, one-half of the tidal component of the vertical dimension required for the compressor (discussed above with reference to FIG. 12) can be eliminated in piston height and in clearance heights. The closed shoreline installation 201 of the wave energy electrical power generation system of the disclosure would then more closely imitate the floating buoy system 10 described above with reference to FIG. 1 et seq.

In FIGS. 12 and 15, the flow of air, A (both intake and exhaust), through upper connecting passageway 208, generated by tidal flow of seawater through lower connecting passageway 206, may also be tapped (e.g. by an air turbine 152, seen in FIG. 15) as an additional source of energy.

Referring still to FIG. 15, the compressor 228 is shown with rolling flexible diaphragm seals between the piston 240 and compressor tank 236, e.g. as employed also in FIG. 12, but the liquid sealing system, e.g. as described above with reference to FIGS. 14 and 14A through 14G, may also be employed for a closed shoreline installation.

Figure 16:
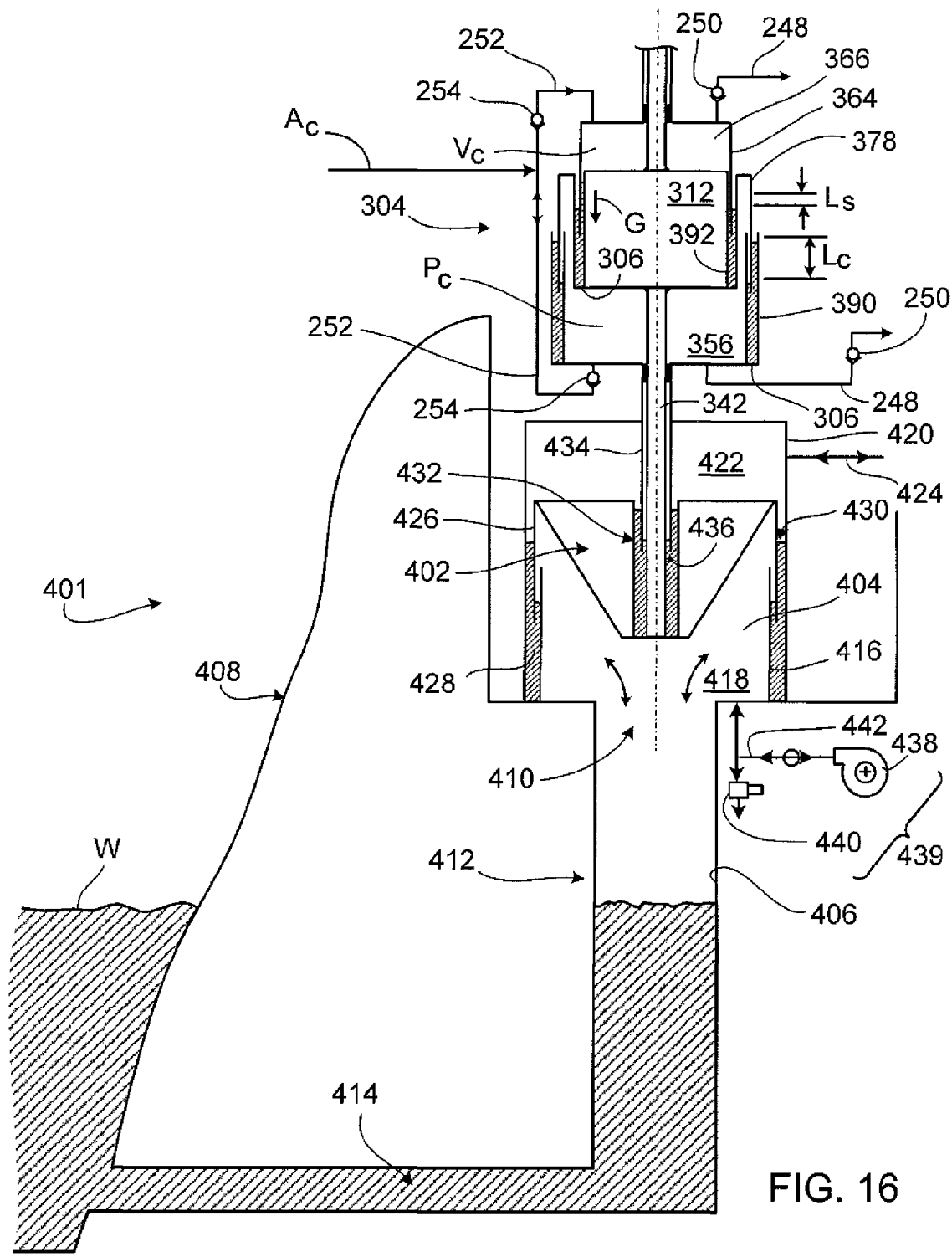
FIG. 16 is a somewhat diagrammatic side plan view of an air compressor assembly for another implementation of a shoreline installation of the wave energy electrical power generation system of FIG. 12, equipped with an alternative tide adjusting mechanism in the form of a neutral buoyancy piston lifted and lowered by air pressure, and using the alternative liquid sealing arrangement of FIGS. 14 and 14A.

For example, referring next to FIG. 16, in another alternative implementation of a closed shoreline installation 401 of the wave energy electrical power generation system of the disclosure, the compressor 304, as described above with reference to FIG. 14 et seq., is driven by a larger reciprocating or lift piston 402, which is driven in turn by compressed air. The piston 402 is disposed within a closed piston cylinder 404 positioned above a vertical cylinder 406 cut into the shore 408. The air in a closed column of air 410 above the shoreline wave surge chamber 412, in communication with a lower chamber 418 of the lift piston cylinder, is compressed by the rising liquid level as a wave comes ashore through horizontal connection passageway 414. As described above, connection passageway 414 permits sea water, SW, to enter and exit the vertical cylinder 406, raising and lowering the level of water in the vertical cylinder, $S_I$, in response to action of the waves, W, against the shore. The compressor 304 has a liquid sealing arrangement, e.g. as described with reference to FIG. 14 et seq., in place of the rolling diaphragms described above with reference to FIG. 12. In the implementation shown in the drawing, the piston 402 also has a liquid sealing arrangement, as will now be described.

Referring still to FIG. 16, a first cylinder 416 defines a lower chamber 418 in communication with the air column 410. A second inverted cylinder 420 extends over the first cylinder 416 and defines an upper chamber 422 in communication with the ambient atmosphere through the ambient relief port 424. An inverted piston cylinder 426 extends over the first cylinder 416 and within the second inverted cylinder 420, with sealing provided by liquid 428 in a liquid trough seal 430 defined between the first and second cylinders 416, 420, respectively, to resist leakage between the lower and upper chambers 418, 422 of the piston cylinder 404. The inverted piston cylinder 426 defines an aperture 432 (e.g., cylindrical or square) receiving the central rod 342 attached to the piston 312 of the compressor 304, with a sleeve 434 about the central rod 342 attached to the compressor piston 312 extending into sealing liquid 436 of the central aperture to resist leakage of air between the upper chamber 422 of the piston and the lower compression chamber portion 356 of the compressor 304. Closed air column 410, responsive to rise and fall of the water flow through the passage 414 due to wave and tide movement, raises and lowers the lift piston 402 by air pressure, in turn to raise and lower the compressor piston 312, which is hard coupled to the reciprocating of lift piston 402 by central piston rod 342.

An air handler 439, including air blower 438 and relief valve 440, is in communication with the closed air column 410 via conduit system 442 for increasing and reducing on demand the mass of air within the closed column of air 410 and lower reciprocating piston chamber 418 in coordination with changes in height of tide, to adjust the baseline or mean position of the piston 402. For example, referring also to FIG. 17, on an inflowing tide (apart from wave motion), as the mean level or height of the water $W_M$, rises in the vertical cylinder 406, air is released from the chamber 410 through relief valve 440, reducing the mass of air and, assuming the combined weight of the neutral buoyancy reciprocating piston 402 with the hard coupled compressor piston 372 and shaft 342 remains relatively constant, the mean position of the neutral buoyancy piston 402 remains relatively constant, with the neutral buoyancy piston 402 reacting (i.e. rising and falling to cause compression of air in the upper chamber and then the lower chamber of the compressor, in alternating fashion) primarily only in response to surge and fall of the water level due to wave action in the wave surge chamber 412. Similarly, on an out flowing tide, the air blower 438 introduces air into the closed air column 410, increasing the mass of air and causing the neutral buoyancy piston 402 to rise relative to the mean level or height of the water, $W_M$, in the vertical column 406, remaining at a relatively constant height, relative to the height of the compressor 304, again with the neutral buoyancy piston 402 reacting (i.e. rising and falling to cause compression of air in the upper chamber and then the lower chamber of the compressor in alternating fashion), primarily only in response to surge and fall of the water level due to wave action in the wave surge chamber 412.

The reciprocating compressed air driven piston arrangement replaces the flotation body arrangement described above with reference to FIG. 15 by adjusting the volume (mass) of air in the closed air column 410 to establish a mean at-rest midpoint for the compressor 304 above the midpoint or mean height of the water surface level, $W_M$, in the surge chamber 412.

Figure 16A:
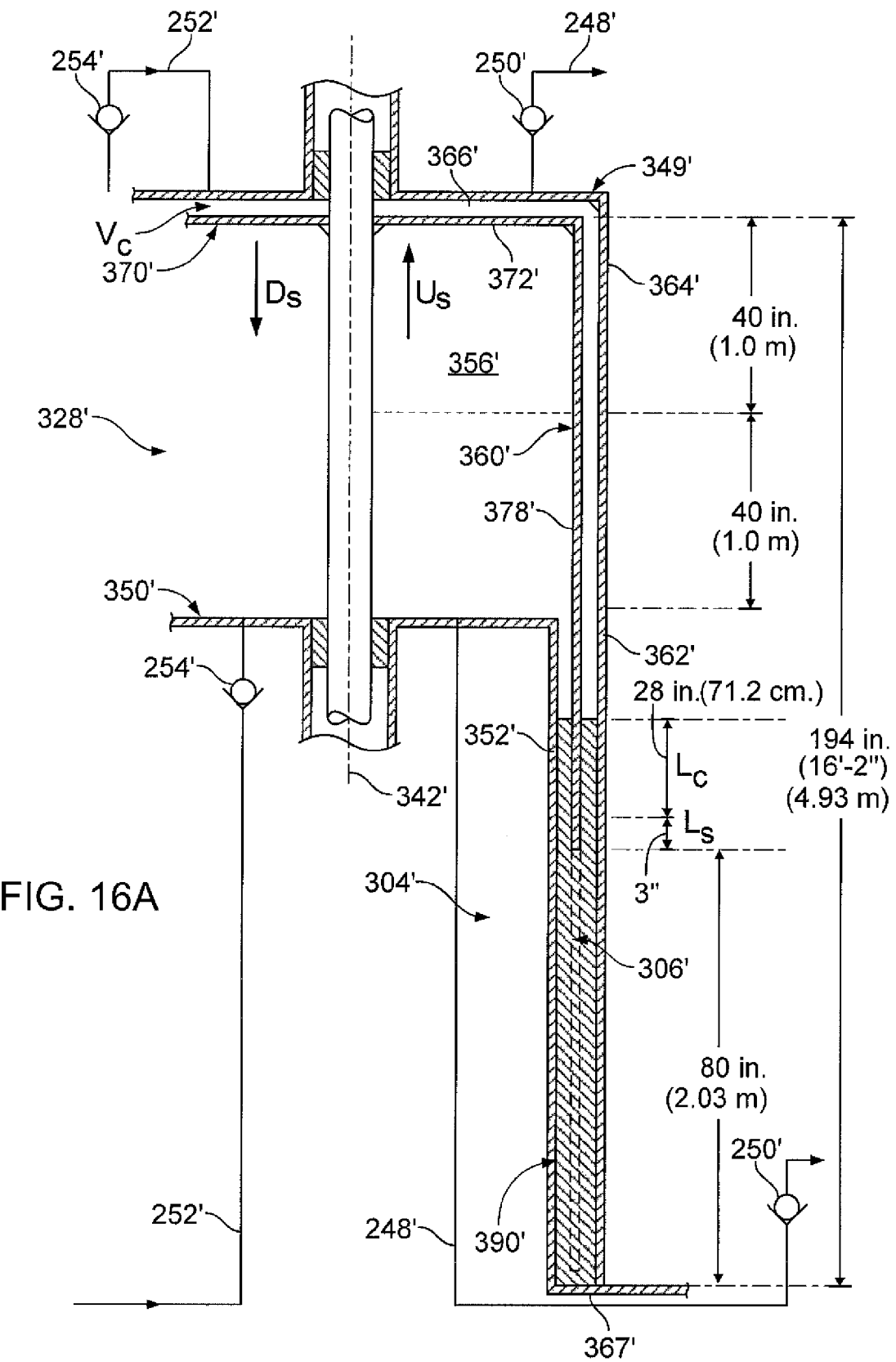
FIG. 16A is a somewhat diagrammatic, sectional side plan view of an air compressor assembly for the implementation of a shoreline installation of the wave energy electrical power generation system of FIG. 16, using another alternative liquid sealing arrangement.

Referring to FIG. 16A, another implementation of a liquid trough sealing arrangement 304' for an air compressor 328' in a closed shoreline installation (e.g., closed shoreline installation 401, shown in FIG. 16) of the wave energy electrical power generation system of the disclosure is shown, e.g. for use in place of the rolling diaphragms described above (in FIG. 12). In this implementation, the air compressor 328' (shown in sectional view) consists of an intermediate piston portion 370' disposed for reciprocating vertical movement within a fixed cylindrical compressor body 349' having an inner base portion 350' and an outer top portion 360'. The inner base portion 350' is an inverted, circular, open-ended base cylindrical element with a down-pending cylindrical inner wall 352'. The top portion 360' is an inverted, circular, open-ended base cylindrical element with a down-pending cylindrical wall 378'. The opposed, down-pending cylindrical walls 352', 362' of body 349' are joined at the base by horizontal wall 367', with the down-pending cylindrical walls 352', 362', together with the horizontal base wall 367', together defining a circular liquid seal trough 390'. The intermediate piston portion 370' consists of an inverted, circular, open-ended central cylindrical element defining a piston body 372' with a down-pending cylindrical outer wall 378'. The inner base portion 350' and the intermediate piston portion 370' together define a lower compression chamber portion 356'. The outer top portion 349' and the intermediate piston portion 370' together define an upper compression chamber portion 366'.

The inner base portion 350' and outer top portion 349' of the compressor body are mutually sized and constructed relative to the reciprocating intermediate piston body 372' to allow the down-pending cylindrical wall 378' of intermediate piston 360' to be received into the liquid trough 390' defined by the compressor body 349', in sealing engagement with the sealant liquid 306' contained therein. The intermediate piston body 372' and central shaft 342' reciprocate within the fixed cylindrical compressor body 349', between a downward compression stroke (arrow, $D_S$), to compress the air in the lower compression chamber portion 356', and an upward compression stroke (arrow, $U_S$), to compress the air in compression chamber portion 366'. As described above, e.g. with reference to FIGS. 1 and 2, during a compression stroke in the upper or lower compression chamber 366', 356', compressed air is passed through an intervening conduit 248' and check valve 250' into a pressure regulator tank (not shown), while air is drawn into the opposed lower or upper compression chamber under suction through conduit 252' and check valve 254'. This arrangement utilizes the seal provided by sealant liquid 306' in circular, liquid trough 390' into which circular, open-ended cylindrical wall 378' of piston is centrally positioned to provide a dam that separates ambient pressure from positive or negative pressure produced by relative vertical movement of the compressor piston element 372'.

In one implementation of the compressor 628', the compressor cylinder has an effective height, $H_T$, e.g. of about 194 inches (16 feet, 2 inches; 4.93 m), providing clearance height, $H_C$, e.g. of about 40 inches (1.02 m), for up and down vertical movement of the compressor piston 372', relative to the compressor cylinder, with the piston having a full travel height, $H_F$, e.g. of about 80 inches (2.03 m). (All dimensions are provided only by way of example.) Each stroke of the compressor piston 372' creates compression or pressure, $P_C$, e.g. of about +28 inches (+71.0 cm) W.C. in the compression chamber portion under compression stroke, and creates suction or vacuum, $V_C$, e.g. of about −3 inches (−7.6 cm) W.C, in the compression chamber portion under suction stroke. As a result, a minimum liquid seal height, $L_S$, e.g. of 3 inches (7.6 cm), is required on the suction stroke and a minimum liquid seal height, $L_C$, e.g. of 28 inches (71.0 cm), is required on the compression stroke. (As above, these minimum liquid seal heights apply to water-based and other sealant liquids having specific gravity of approximately 1.0 and can be adjusted for sealant liquids of other specific gravity.)

Figure 17:
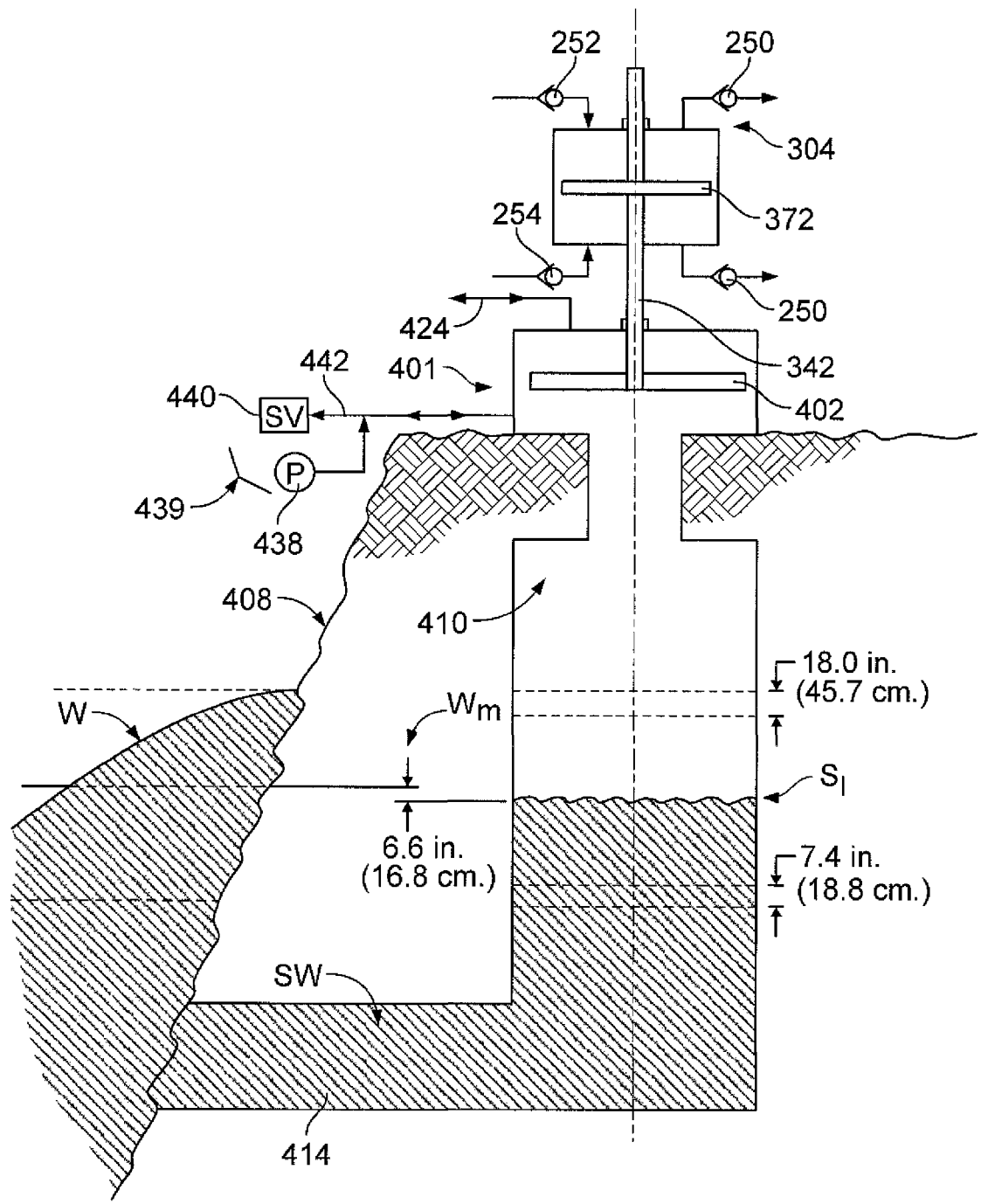
FIG. 17 is a somewhat diagrammatic side plan view of another implementation of the wave energy electrical power generation system shoreline installation of FIG. 16, and FIGS. 17A through 17H represent sample calculations for a representative air compressor and tide adjusting mechanism assembly of FIG. 17.

Referring now to FIG. 17, and to FIGS. 17A through 17H, FIG. 17 is a somewhat diagrammatic side plan view of a representative implementation of the wave energy electrical power generation system shoreline installation of FIG. 16, and FIGS. 17A through 17H represent sample calculations for sizing elements for this representative air compressor and tide adjusting mechanism assembly.

In the representative system of FIG. 17, the compressor 304 has a weight of 878 lbs. (398 kg) (calculated below, FIG. 17A) and an output pressure of, e.g., 20 inches (50.8 cm) W.C. The compressor also has a diameter of 2.00 m, with an area of approximately 3.14 m², and the compressor piston has a stroke of 2.0 m and maximum volume per wave of 12.28 m³. The 402 has a weight of 2,432 lbs. (1,103 kg) (calculated below, FIG. 17C). The lift piston also has a diameter of 2.83 m, with an area of approximately 6.28 m², and the compressor piston has a stroke of 2.0 m. The surge chamber 412 of the vertical cylinder 406 has a diameter of 2.83 m, and an area of approximately 6.28 m², with neutral pressure of 6.6 inches (16.8 cm) W.C., upward pressure of 21.0 inches (53.3 cm) W.C., and downward pressure of 4.5 inches (11.4 cm) W.C.

FIG. 17A represents a sample calculation of the weight of the compressor piston, including a 1 meter deep side cylinder for sealing, e.g. in a liquid sealing trough or with a rolling diaphragm, and assuming a wall thickness of 0.200 inch (5.1 mm). In the sample calculation shown in the drawing, the total weight of the compressor piston is 878 pounds (398 kg).

FIG. 17B represents a sample calculation of the force required to lift the piston weight ($W_T$) plus compress air to +20 inches (+50.8 cm) W.C. and draw in air on the suction side at −3 inches (−7.6 cm) W.C. In the sample calculation shown in the drawing, the force required to lift the piston weight plus compress air to +20 inches (+50.8 cm) W.C. and draw in air on the suction side at −3 inches (−7.6 cm) W.C. is 4,883 pounds (2,215 kg).

FIG. 17C represents a sample calculation of the weight of the lift piston at 2.83 M.O.D. (111.5 inches (2.83 m)), assuming wall thickness of 0.200 inch (5.1 mm), plus the weight of a 6 inch (15.2 cm) O.D. by 4 inch (10.2 cm) I.D. center shaft approximately 18 feet (5.49 m) long. In the sample calculation shown in the drawing, the total weight of the neutral buoyancy lift piston and center shaft is 2,432 pounds (1,103 kg).

FIG. 17D represents a sample calculation of the force required for the upward compression stroke. In the sample calculation shown in the drawing, the force required for the upward compression stroke is 7,315 pounds (3,318 kg).

FIG. 17E represents a sample calculation of the pressure required (in W.C.) for the upward compression stroke. In the sample calculation shown in the drawing, the pressure required for the upward compression stroke is 21.0 inches (53.3 cm) W.C.

FIG. 17F represents a sample calculation of the force required for the downward compression stroke. In the sample calculation shown in the drawing, the force required for the downward compression stroke is 1,573 pounds (714 kg).

FIG. 17G represents a sample calculation of the pressure (in W.C.) required for the downward compression stroke. In the sample calculation shown in the drawing, the pressure required for the downward compression stroke is 4.51 inches (11.5 cm) W.C.

FIG. 17H represents a sample calculation of the neutral pressure (in W.C.) in the closed air column. In the sample calculation shown in the drawing, the neutral pressure in the closed air column is 10.1 inches (25.7 cm) W.C.

Figure 18:
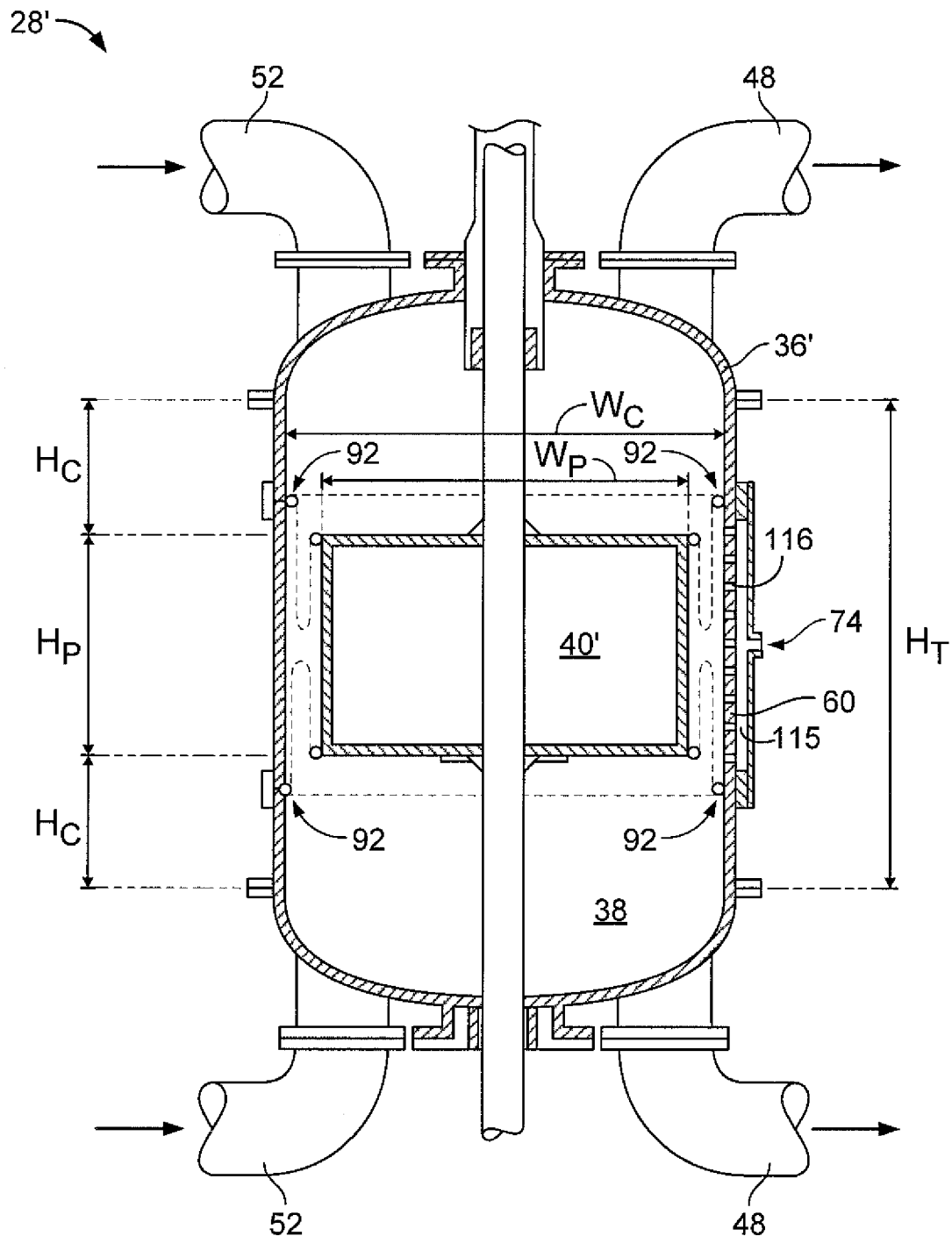
FIG. 18 is a side section view of another implementation of an air compressor of the power generation system of FIG. 1, with conduits for flow of air into and out of the compressor cylinder.

Finally, referring to FIG. 18, in another implementation of a compressor 28', the compressor piston 40' may have a diameter or width, $W_P$, e.g. 2.4 m, while the compressor cylinder 36' has an internal diameter or width, $W_C$, e.g. 2.5 m, and the piston has a vertical height, $H_P$, e.g. 1.20 m, while the compressor cylinder has an effective height, $H_T$, e.g. 3.20 m, providing clearance height, $H_C$, e.g. 1.00 m, for up and down vertical movement of the compressor piston, relative to the compressor cylinder. As described above, the sealed region defined by the flexible diaphragms between the wall of the cylinder and the opposed surface of the piston is maintained, e.g., at −6 inches (−15.2 cm) W.C. by a vacuum pump acting through vacuum port 74, and thereafter acting through a flow channel and vacuum distribution holes in the wall of the regulator tank (see, e.g., FIGS. 9 and 9B). Operation under vacuum serves to resist collapse of the rolling diaphragm seals during movement of the piston, and also maintains seal shape, e.g. when system air pressure falls to atmospheric conditions, such as when the sea is calm.

While, to facilitate understanding of the disclosure, the wave energy electrical power generation system 10 above has been described above with a single compressor, regulator, air reservoir, and air turbine/generator set, it will be recognized that other numbers of systems and/or system components may be combined, including in one or more sets of floating buoys, or in one or more shoreline installations, according to this disclosure. Similarly, certain elements and arrangements, e.g. cooperative snubber cylinders and snubber cavities, have been described in combination with one or only a few systems; however, it is to be understood by those of ordinary skill in the art that such elements and systems may be employed with similar advantage and effect in other systems.

Accordingly, other implementations are within the scope of the following claims.

What is claimed is:

1. A wave energy electric power generation system, comprising:
    a buoyant body responsive to vertical wave movement and an associated, relatively vertically stationary body;
    a working compressor comprising a compressor cylinder and a compressor piston, said compressor piston being mounted for reciprocal movement relative to said compressor cylinder to alternately compress air in opposed air compressor chambers;
    a pressure regulator comprising
        a pressure regulator tank defining a regulator chamber in communication with the compressor cylinder for alternately receiving compressed air from each of the opposed air compression chambers,
        a floating piston disposed within said pressure regulator tank and mounted to apply pressure to compressed air received into the regulator chamber, and
        a pressure controller coupled to the floating piston for controlling pressure applied by the floating piston to compressed air in the regulator chamber and an hydraulic dampening system coupled to the floating piston for restricting unwanted vertical oscillations of the floating piston, for output of a continuous flow of compressed air at relatively constant pressure; and
    an air turbine and generator set disposed in communication with said pressure regulator for receiving the output of the flow of compressed air from the pressure regulator and from the compressor at relatively constant pressure to rotate the air turbine to drive the generator for generation of electric power.

2. The wave energy electric power generation system of claim 1, wherein said compressor further comprises a pair of rolling diaphragms extending between the compressor piston and an opposed wall of the compressor cylinder to permit efficient, almost frictionless reciprocal movement of the compressor piston relative to the compressor cylinder to alternately compress air in the opposed air compression chambers.

3. The wave energy electric power generation system of claim 1, wherein the pressure regulator further comprises a pair of rolling diaphragms extending between the floating piston and an opposed wall of the pressure regulator tank to permit efficient, almost frictionless reciprocal movement of the floating piston relative to the pressure regulator tank.

4. The wave energy electric power generation system of claim 1, wherein said associated, relatively vertically stationary body comprises a relatively vertically stationary neutral buoyancy piston, said compressor cylinder is mounted for vertical movement with the buoyant body, and the compressor piston is mounted to the relatively vertically stationary neutral buoyancy piston.

5. The wave energy electric power generation system of claim 4, wherein the compressor cylinder is mounted to a buoyant body for vertical movement responsive to vertical wave movement upon a surface of water, and the compressor piston is mounted to an associated, relatively vertically stationary neutral buoyancy piston.

6. The wave energy electric power generation system of claim 1, wherein the associated, relatively vertically stationary body comprises a land or shoreline mounting, said compressor cylinder is disposed upon said land or shoreline mounting, and said compressor piston is mounted to said buoyant body responsive to vertical movement of a surface of a body of water.

7. The wave energy electrical power generation of claim 6, wherein the buoyant body is disposed upon a volume of pressurized air responsive to vertical movement of a surface of a body of water.

8. The wave energy electrical power generation system of claim 7, wherein the buoyant body is disposed upon a closed column of pressurized air responsive to reciprocating movement of surface of a water, and said system further comprises an air handler in communication with said closed column of pressurized air and adapted for increasing and reducing the mass of air within said closed column for adjustment of the baseline position of the buoyant body with changes in tide.

9. The wave energy electric power generation system of claim 1 in a land or shoreline placement of said compression cylinder, wherein said compression cylinder comprises upper and lower opposed circular, open-ended cylindrical elements defining upper and lower compression chambers, and
said compressor piston and a first said circular open-ended cylindrical element each defines a circular liquid trough containing a sealant liquid,
the circular liquid trough defined by the piston being sized and arranged to receive a rim wall of the upper circular, open-ended cylindrical element in sealing engagement with the sealant liquid during alternating compression and suction strokes, and
a circular liquid trough defined by the lower circular open-ended cylindrical element being sized and arranged to receive a rim wall of the piston element in sealing engagement with the sealant liquid during alternating suction and compression strokes.

10. The wave energy electric power generation system of claim 9, wherein a compression stroke of said compressor piston creates compression or pressure of about +28 inches (+71.0 cm) W.C.

11. The wave energy electric power generation system of claim 10, wherein the associated liquid trough contains a sealant liquid having a specific gravity of approximately 1.0 and provides a sealing depth of at least about 28 inches (70.1 cm).

12. The wave energy electric power generation system of claim 9 or claim 10, wherein a suction stroke of said compressor piston creates suction of about −3 inches (−7.6 cm) W.C.

13. The wave energy electric power generation system of claim 12, wherein the associated liquid trough contains a sealant liquid having a specific gravity of approximately 1.0 and provides a sealing depth of at least about 3 inches (7.6 cm).

14. The wave energy electric power generation system of claim 1 or claim 7, further comprising a buoyant body in the form of a lift piston disposed for vertical reciprocating movement in a piston cylinder,
said piston cylinder comprises upper and lower opposed circular, open-ended cylindrical elements defining upper and lower piston chambers, and
said upper and lower circular open-ended cylindrical elements together define a circular liquid trough containing a sealant liquid,
the circular liquid trough defined by said upper and lower circular, open-ended cylindrical elements being sized and arranged to receive a rim wall of the lift piston in sealing engagement with the sealant liquid during reciprocating vertical movement of said lift piston.

15. The wave energy electric power generation system of claim 14, wherein the upper piston chamber is in communication with an external ambient atmosphere.

16. The wave energy electric power generation system of claim 14, wherein the lower piston chamber is in communication with a closed column of pressurized air responsive to vertical wave movement.

17. The wave energy electrical power generation system of claim 14, wherein the buoyant body is disposed upon a closed column of pressurized air responsive to reciprocating movement of surface of a water, and said system further comprises an air handler in communication with said closed column of pressurized air and adapted for adjusting the mass of air within said closed column for adjustment of the baseline position of the buoyant body with changes in tide.

18. The wave energy electrical power generation system of claim 17, wherein said air handler comprises an air pump for increasing the mass of air contained within said closed column of air.

19. The wave energy electrical power generation system of claim 17, wherein said air handler comprises an air relief valve for decreasing the mass of air contained within said closed column of air.

20. The wave energy electrical power generation system of claim 18, wherein said air handler comprises an air relief valve for decreasing the mass of air contained within said closed column of air.

21. A wave energy electric power generation system, comprising:
a buoyant body responsive to vertical wave movement upon a surface of water and an associated, relatively vertically stationary neutral buoyancy piston;
a working compressor comprising
a compressor cylinder mounted for vertical movement with the buoyant body,
a compressor piston mounted to the relatively stationary neutral buoyancy piston, and a pair of rolling diaphragms extending between the compressor piston and an opposed wall of the compressor cylinder to permit efficient, almost frictionless reciprocal movement of the compressor piston relative to the compressor cylinder to alternately compress air in opposed air compression chambers;

a pressure regulator comprising a pressure regulator tank defining a regulator chamber in communication with the compressor cylinder for alternately receiving compressed air from each of the opposed air compression chambers, a floating piston disposed within said pressure regulator tank and mounted to apply pressure to compressed air received into the regulator chamber, a pressure controller coupled to the floating piston for controlling pressure applied by the floating piston to compressed air in the regulator chamber and an hydraulic dampening system coupled to the floating piston for restricting unwanted vertical oscillations of the floating piston, for output of a continuous flow of compressed air at relatively constant pressure, and a pair of rolling diaphragms extending between the floating piston and an opposed wall of the pressure regulator tank to permit efficient, almost frictionless reciprocal movement of the floating piston relative to the pressure regulator tank; and an air turbine and generator set disposed in communication with said pressure regulator for receiving the output of the flow of compressed air from the pressure regulator to rotate the air turbine to drive the generator for generation of electric power.

22. The wave energy generation system of claim 2 or claim 21, wherein the pair of rolling diaphragms extending between the compressor piston and an opposed wall of the compressor cylinder defines a closed compressor region, and said system further comprises a vacuum pump in communication with said closed compressor region.

23. The wave energy generation system of claim 22, said vacuum pump depressurizes said closed compressor region to a predetermined pressure.

24. The wave energy generation system of claim 23, wherein said predetermined pressure is of the order of −6 inches (−15.2 cm) W.C.

25. The wave energy generation system of claim 2 or claim 21, wherein the pair of rolling diaphragms extending between the floating piston and an opposed wall of the regulator tank defines a closed regulator region, and said system further comprises a vacuum pump in communication with said closed regulator region.

26. The wave energy generation system of claim 25, said vacuum pump depressurizes said closed regulator region to a predetermined pressure.

27. The wave energy generation system of claim 26, wherein said predetermined pressure is of the order of −6 inches (−15.2 cm) W.C.

28. The wave energy generation system of claim 1 or claim 21, further comprising an air system comprising:

a reservoir for receiving, storing and delivering a closed system of air, and an open system of conduits for delivery of chamber air to each of the compressor, the pressure regulator, the air turbine and the reservoir.

29. The wave energy generation system of claim 28, wherein the reservoir comprises:

a flexible bladder defining a volume for receiving, storing and delivering the closed system air, and a tank containing said bladder and defining an ambient air region external of said bladder.

30. The wave energy generation system of claim 28, wherein the system of conduits comprises check valves for controlling the direction of air flow into the compressor, and from the compressor to the pressure regulator and/or to the air turbine.

31. The wave energy generation system of claim 30, wherein said check valves comprise check valve assemblies comprising opposed plates mounted for reciprocating closed-to-open-to-closed travel under control of a double spring flexure assembly, the opposed plates defining opposed sealing surfaces and offset air flow regions disposed in communication in a check valve open position and defined by opposed sealing surfaces.

32. The wave energy generation system of claim 31, wherein the opposed sealing surfaces are conical in cross section and define sloped surfaces sealed by flexible seal rings.

33. The wave energy generation system of claim 30, wherein the pressure regulator and the compressor are in communication through a compressed air conduit.

34. The wave energy generation system of claim 33, wherein the compressed air conduit comprises check valves for controlling the direction of air flow into the compressor and from the compressor to the pressure regulator and/or to the air turbine.

35. The wave energy generation system of claim 34, wherein said check valves comprise check valve assemblies comprising opposed plates mounted for reciprocating closed-to-open-to-closed travel under control of a double spring flexure assembly, the opposed plates defining opposed surfaces of alternating, generally concentric rings of conical ridge surfaces and conical valley surfaces, the conical valley surfaces defining air flow regions.

36. The wave energy generation system of claim 35, wherein said conical ridge surfaces further comprise flexible seal rings disposed during closing motion for initial engagement with opposed conical valley surfaces.

37. The wave energy generation system of claim 29, further comprising an air pump.

38. The wave energy generation system of claim 30, further comprising an air pump.

39. The wave energy electric power generation system of claim 1 or claim 21, wherein said hydraulic dampening system comprises a double acting piston coupled with the floating piston and responsive to vertical velocity of the floating piston within the pressure regulator chamber for controlling flow rate of hydraulic pressure fluid to the piston, for restricting unwanted vertical oscillations of the floating piston.

40. The wave energy electric power generation system of claim 1 or claim 21, wherein said compressor piston is mounted in said compressor cylinder upon a central rod having a flat-sided cross-section portion on at least one side of the compressor piston engaged in a corresponding flat-sided aperture, for resisting relative rotation between said compressor piston and said compressor cylinder.

41. The wave energy electric power generation system of claim 40, further comprising a guidance system for said central rod of said compressor piston, said guidance system comprising one or more pairs of opposed rollers disposed in engagement with opposite surfaces of one or more of said flat-sided cross-section portions.

42. The wave energy electric power generation system of claim 41, wherein said one or more flat-sided cross-section portions and the corresponding said flat-sided aperture are square.

43. The wave energy electric power generation system of claim 1 or claim 21, wherein said floating piston is mounted in said regulator tank upon a central rod having a flat-sided cross-section portion on at least one side of the floating piston engaged in a corresponding flat-sided aperture, for resisting relative rotation between said floating piston and said regulator tank.

44. The wave energy electric power generation system of claim 43, further comprising a guidance system for said central rod of said floating piston, said guidance system comprising one or more pairs of opposed rollers disposed in engagement with opposite surfaces of one or more of said flat-sided cross-section portions.

45. The wave energy electric power generation system of claim 44, wherein said flat-sided cross-section portion and said flat-sided aperture are square, and the flat-sided aperture is defined by opposed surfaces of two pairs of opposed, bearing-supported rollers.

46. The wave energy electric power generation system of claim 1 or claim 21, further comprising an electrical power transmission system for delivery of generated electrical power for distribution and consumption at remote locations.

47. The wave energy electric power generation system of claim 1 or claim 21, further comprising:
 a hydraulic shock absorber arrangement comprising at least one set of a snubber piston member and an opposed member defining a snubber cavity of cooperating configuration and containing a hydraulic fluid,
 one of the snubber piston and the opposed snubber cavity being mounted to the reciprocating buoyant body and the other of the snubber piston and the opposed snubber cavity being mounted to the associated, relatively vertically stationary body, both in relative positions for shock absorbing engagement in a predetermined region corresponding to at least one of an upper end and a lower end of a range of relative motion between the buoyant body and the associated, vertically stationary body.

48. The wave energy electric power generation system of claim 47, wherein the hydraulic shock absorbing arrangement comprises:
 a first snubber piston member and a first opposed member defining a snubber cavity of cooperating configuration and containing a hydraulic fluid mounted in relative positions for shock absorbing engagement in a predetermined region corresponding to the upper end of the range of motion between the buoyant body and the associated, vertically stationary body, and
 a second snubber piston member and a second opposed member defining a snubber cavity of cooperating configuration and containing a hydraulic fluid mounted in relative positions for shock absorbing engagement in a predetermined region corresponding to the lower end of the range of motion between the buoyant body relative and the associated, vertically stationary body.

49. The wave energy electric power generation system of claim 48, wherein
 the first snubber piston member and the second snubber piston member are mounted at opposite ends of the associated, vertically stationary body, and
 the opposed member defining the first snubber cavity and the opposed member defining the second snubber cavity are mounted to a surface of the buoyant body above and below the associated, vertically stationary body.

\* \* \* \* \*

UNITED STATES PATENT AND TRADEMARK OFFICE
CERTIFICATE OF CORRECTION

| | | |
|---|---|---|
| PATENT NO. | : 9,068,554 B2 | Page 1 of 1 |
| APPLICATION NO. | : 13/727235 | |
| DATED | : June 30, 2015 | |
| INVENTOR(S) | : James W. Healy | |

It is certified that error appears in the above-identified patent and that said Letters Patent is hereby corrected as shown below:

In the claims

Col. 27, line 34, Claim 7, delete "generation" and insert -- generation system --, therefor.

Col. 30, line 46, Claim 39, delete "a double acting" and insert -- a --, therefor.

Signed and Sealed this
Seventeenth Day of November, 2015

Michelle K. Lee
*Director of the United States Patent and Trademark Office*

UNITED STATES PATENT AND TRADEMARK OFFICE
CERTIFICATE OF CORRECTION

| | | |
|---|---|---|
| PATENT NO. | : 9,068,554 B2 | Page 1 of 1 |
| APPLICATION NO. | : 13/727235 | |
| DATED | : June 30, 2015 | |
| INVENTOR(S) | : James W. Healy | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 336 days.

Signed and Sealed this
Twenty-eighth Day of June, 2016

Michelle K. Lee
*Director of the United States Patent and Trademark Office*